(12) United States Patent
Yang et al.

(10) Patent No.: US 11,438,858 B2
(45) Date of Patent: Sep. 6, 2022

(54) METHOD FOR MEASURING FRAME TIMING DIFFERENCE AND USER EQUIPMENT PERFORMING THE METHOD

(71) Applicant: LG Electronics Inc., Seoul (KR)

(72) Inventors: Yoonoh Yang, Seoul (KR); Sangwook Lee, Seoul (KR); Suhwan Lim, Seoul (KR); Manyoung Jung, Seoul (KR); Jinyup Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/969,361

(22) PCT Filed: Feb. 1, 2019

(86) PCT No.: PCT/KR2019/001448
§ 371 (c)(1),
(2) Date: Aug. 12, 2020

(87) PCT Pub. No.: WO2019/160266
PCT Pub. Date: Aug. 22, 2019

(65) Prior Publication Data
US 2021/0051618 A1    Feb. 18, 2021

Related U.S. Application Data

(60) Provisional application No. 62/629,707, filed on Feb. 13, 2018.

(51) Int. Cl.
*H04W 56/00* (2009.01)
*H04W 48/08* (2009.01)

(52) U.S. Cl.
CPC ....... *H04W 56/0065* (2013.01); *H04W 48/08* (2013.01); *H04W 56/0005* (2013.01); *H04W 56/0045* (2013.01)

(58) Field of Classification Search
None
See application file for complete search history.

(56) References Cited

U.S. PATENT DOCUMENTS

2019/0182880 A1*   6/2019   Yang .................... H04W 76/15
2019/0215711 A1*   7/2019   Tsai ................... H04W 56/0045
(Continued)

OTHER PUBLICATIONS

Author Unknown, SFTD reporting for non-configured PSCell, Doc. No. R1-1800940, pp. 1-6, Jan. 28, 2018.*
(Continued)

*Primary Examiner* — Christopher M Crutchfield
(74) *Attorney, Agent, or Firm* — Fish & Richardson P.C.

(57) ABSTRACT

There is provided a method for measuring a frame timing difference. The method performed by a User Equipment (UE) and comprises: based on (i) that an Evolved Universal Mobile Telecommunications System (UMTS) Terrestrial Radio Access (EUTRA) cell is configured for a primary cell and based on (ii) that a secondary cell is not configured, measuring the frame timing difference between the E-UTRA cell and a New Radio (NR) cell based on a Synchronization Signal (SS)/Physical Broadcast Channel (PBCH) Block (SSB) Measurement Time Configuration (SMTC) period, wherein the NR cell is found regardless of a position of a SSB of the NR cell; and reporting a System Frame Number (SFN) and Frame Timing Difference (SFTD) based on the frame timing difference to the E-UTRA cell.

16 Claims, 19 Drawing Sheets

(56) References Cited

U.S. PATENT DOCUMENTS

2019/0261444 A1* 8/2019 Axmon ............... H04W 56/001
2021/0409988 A1* 12/2021 Harada ................ H04L 5/0053

OTHER PUBLICATIONS

Author Unknown, LS on SFTD measurement definition for inter-RAT NR neighbor cell, pp. 1-2, Jan. 26, 2018.*
Author Unknown, SSTD measurement for asynchronous LTE-NR DC, Doc. No. R4-1713012, pp. 1-3, Dec. 1, 2017.*
Author Unknown, Discussion on SSTD measurement for asynchronous EN-DC, pp. 1-2, Jan. 26, 2018.*
Author Unknown, SFTD measurement for asynchronous LTE-NR DC, Doc. No. R4-1800569, pp. 1-3, Jan. 26, 2018.*
Author Unknown, Discussion on measurement gap patterns for SSTD measurement, Doc. No. R4-1800642, pp. 1-3, Jan. 26, 2018.*
Huawei, HiSilicon, Discussion on SSTD measurement for EN-DC based on RAN4 LS, R2-1800716, 3 GPP TSG-RAN WG2 NR Ad hoc 1801, Vancouver, Canada, Jan. 22-26, 2018, 2 pages.
MediaTek Inc., On SFTD measurement before PSCell configuration, R4-1800112, 3GPP TSG-RAN WG4 AH1801 Meeting, San Diego, CA, USA, Jan. 21-26, 2017, 4 pages.
NTT DOCOMO, INC., SFTD measurement for asynchronous LTE-NR DC, R4-1800569, 3GPP TSG-RAN WG4 Meeting AH-1801, San Diego, US, Jan. 22-26, 2018, 3 pages.
Huawei, HiSilicon, Discussion on measurement gap patterns for SSTD measurement, R4-1800642, 3 GPP TSG-RAN WG4 Meeting AH-1801, San Diego, US, Jan. 22-26, 2018, 3 pages.
Ericsson, SFTD reporting for non-configured PSCell, R4-1800940, 3GPP TSG RAN WG4 Meeting #AH-1801, San Diego, California, US, Jan. 22-26, 2018, 6 pages.
Axman, RAN WG4, "[Draft] LS reply on L TE measurement gap patterns for SSTD measurement," R4-1800941, 3GPP TSG-RAN WG4 Meeting #AH-1801, San Diego, California, US, dated Jan. 22-26, 2018, 1 page.
EP Extended European Search Report in European Appln. No. 19754786.2, dated Feb. 26, 2021, 9 pages.
NTT DOCOMO, INC., "SSTD measurement for asynchronous LTE-NR DC," R4-1713012, 3GPP TSG RAN WG4 Meeting #85, Reno, US, dated Nov. 27-Dec. 1, 2017, 3 pages.

* cited by examiner

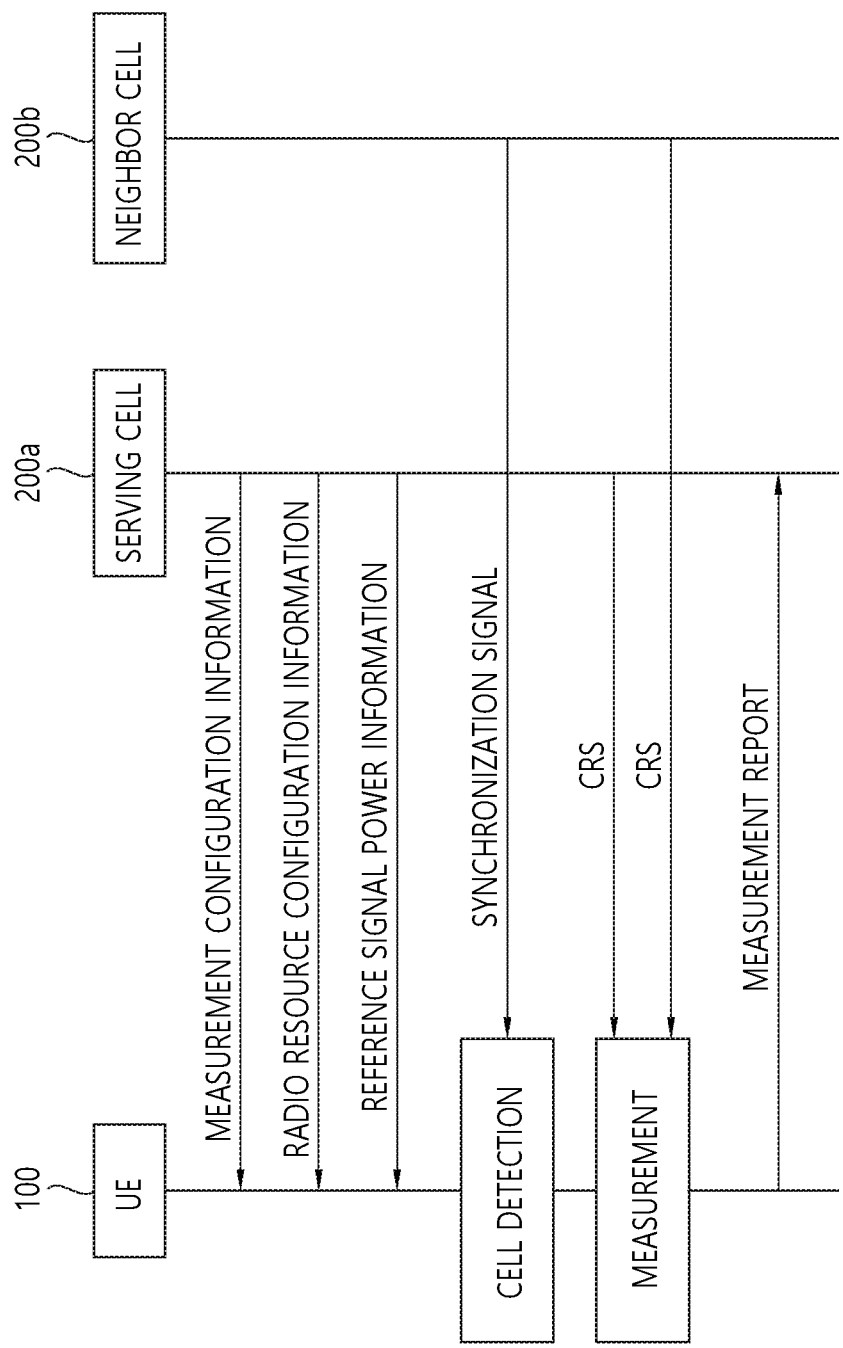

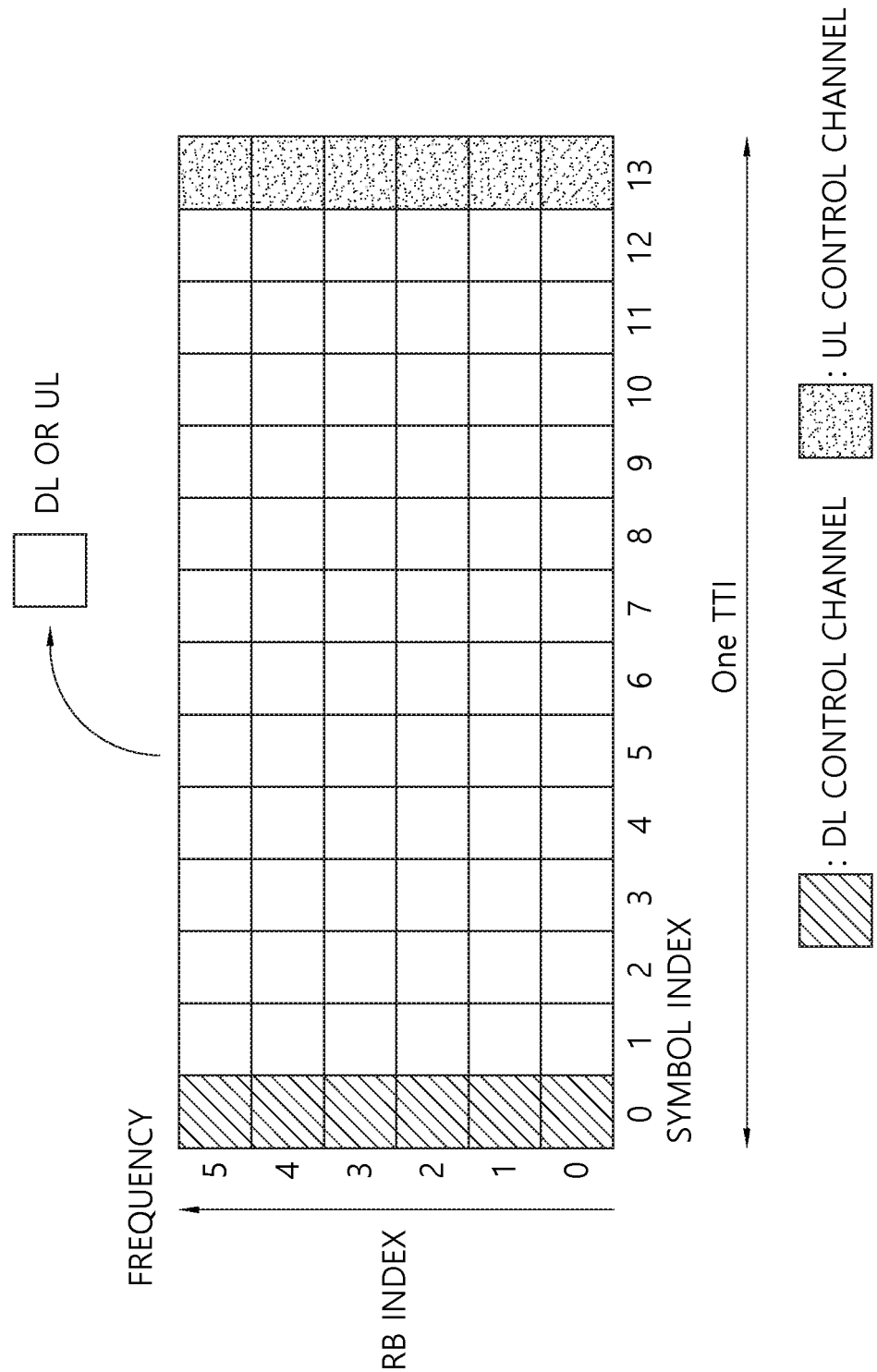

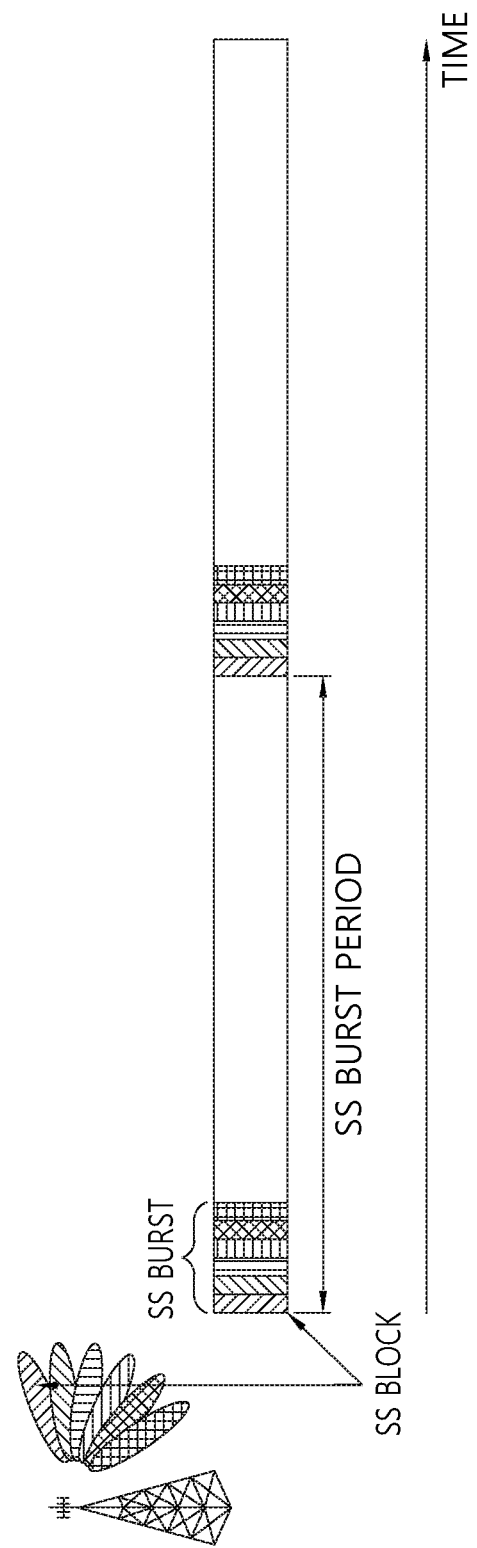

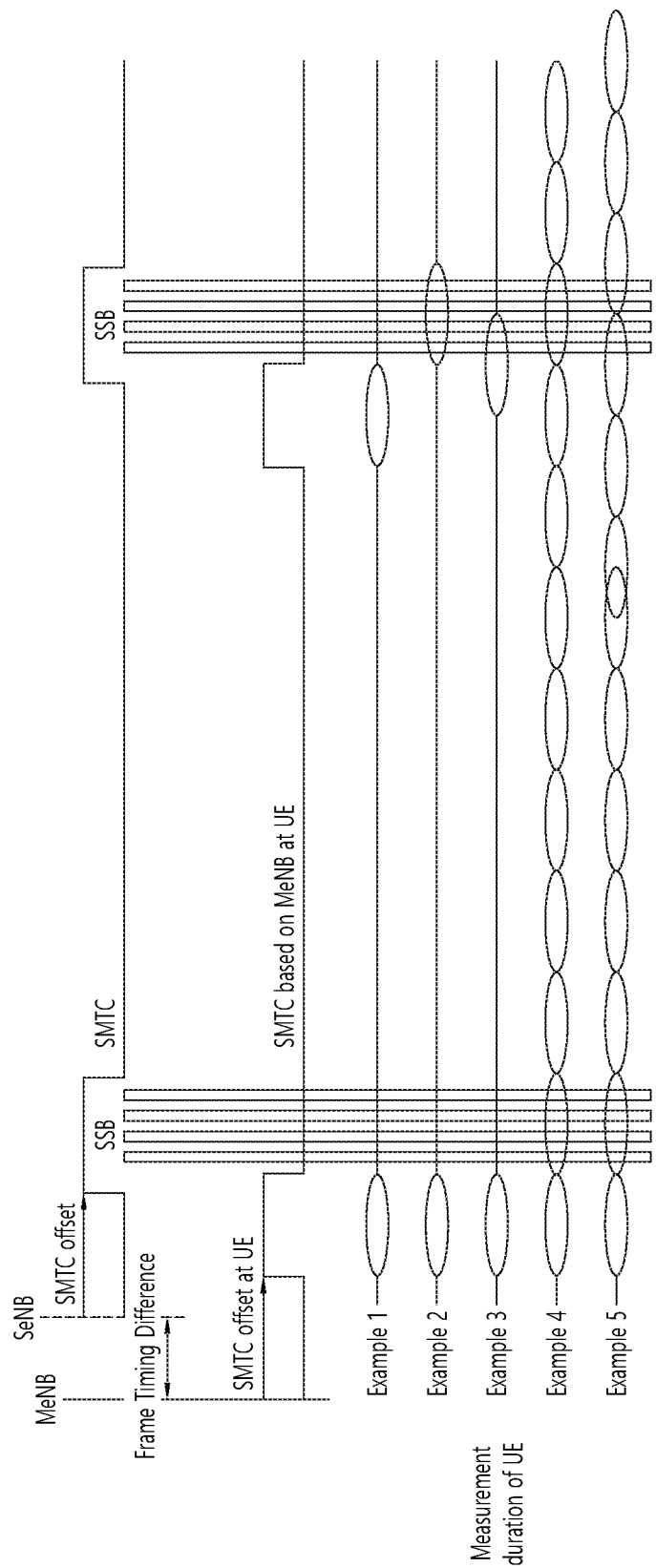

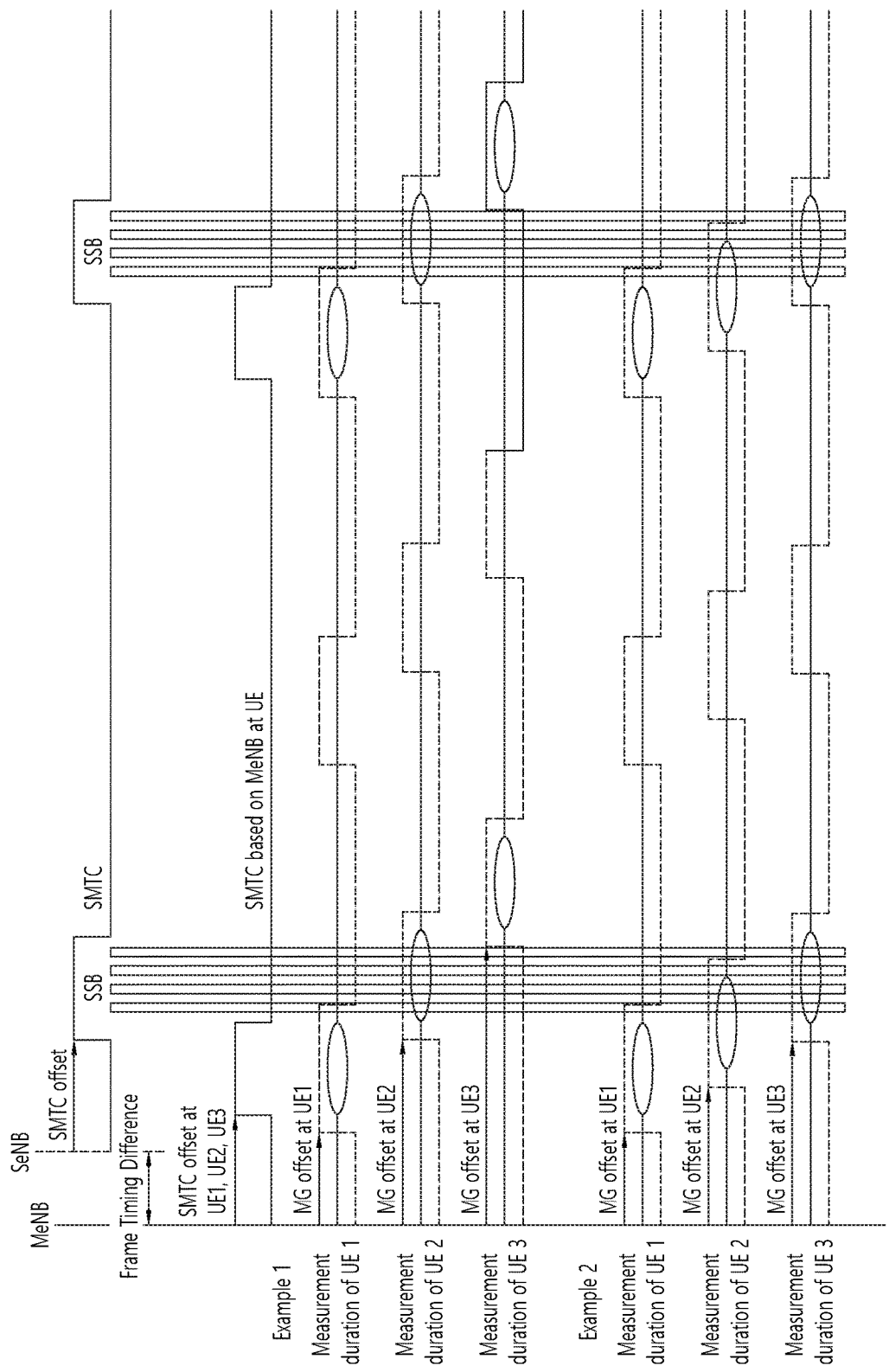

METHOD FOR MEASURING FRAME TIMING DIFFERENCE AND USER EQUIPMENT PERFORMING THE METHOD

CROSS-REFERENCE TO RELATED APPLICATIONS

This application is a National Stage application under 35 U.S.C. § 371 of International Application No. PCT/KR2019/001448, filed on Feb. 1, 2019, which claims the benefit of U.S. Provisional Application No. 62/629,707, filed on Feb. 13, 2018. The disclosures of the prior applications are incorporated by reference in their entirety.

TECHNICAL FIELD

The present invention relates to mobile communication.

BACKGROUND

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

With the success of long term evolution (LTE)/LTE-A (LTE-Advanced) for the 4th generation mobile communication, more interest is rising to the next generation, i.e., 5th generation (also known as 5G) mobile communication and extensive research and development are being carried out accordingly.

According to the International Telecommunication Union (ITU), the fifth generation (5G) mobile communication is defined as a mobile communication technology that provides a maximum data transmission rate of 20 Gbps and a minimum experienced data rate of 100 Mbps or more in any location. The official term is 'IMT-2020', which aims worldwide commercial usage by the year of 2020.

The ITU proposes three major usage scenarios, such as an enhanced Mobile BroadBand (eMBB), a massive Machine Type Communication (mMTC), and an Ultra Reliable and Low Latency Communications (URLLC).

The URLLC relates to a usage scenario requiring high reliability and a low latency time (or delay time). For example, services such as automated driving, factory automation, augmented reality (AR), and so on, require high reliability and a low latency time (e.g., a latency time of 1 ms or less). Statistically, the latency time of the current 4G (LTE) is within the range of 21-43 ms (best 10%) and 33-75 ms (median). This is insufficient for supporting a service that requires a latency time of 1 ms or less. The following eMBB usage scenario corresponds to a usage scenario that requires a mobile ultra-wide band.

More specifically, the 5th generation mobile communication system aims to achieve a capacity that is greater than the current 4G LTE. The 5G mobile communication system is also capable of increasing user density for mobile wideband users and supporting Device to Device (') communication, high stability, and Machine Type Communication (MTC). The 5G research and development also aims to achieve a lower latency time and lower battery power consumption as compared to the 4G mobile communication system in order to successfully implement the Internet of Things (IoT). For such 5G mobile communication, a new radio access technology (New RAT or NR) may be proposed.

In the NR, a user equipment (UE) may perform NR non-standalone (NSA) operation mode with Evolved Universal Terrestrial Radio Access (E-UTRA), which is included in the 3GPP LTE. The NSA operation mode is a mode of operation that NR communication is assisted with E-UTRA communication or operation of E-UTRA communication is assisted with NR communication. The UE can perform E-UTRA-NR Dual Connectivity (EN-DC) operation which allows the UE to exchange data between itself and NR base station along with simultaneous connection with E-UTRA (or LTE) base station. When the UE in NSA operation mode performs EN-DC operation with E-UTRA, the UE may transmit or receive both E-UTRA uplink signal and NR uplink signal simultaneously.

For UE performing an EN-DC operation, the UE needs to measure and report System Frame Number (SFN) and Frame Timing Difference (SFTD) between a NR cell and an E-UTRA cell. If the E-UTRA cell is configured for a primary cell and a secondary cell is not configured, the UE needs to detect Synchronization Signal (SS)/Physical Broadcast Channel (PBCH) Block (SSB) of the NR cell for the measurement of the SFTD.

The E-UTRA cell receives SSB Measurement Time Configuration (SMTC) information from the NR cell and transmits the SMTC information to the UE. If asynchronous EN-DC operation is performed, transmission timing of radio frame of the E-UTRA cell and the NR cell are not synchronized to each other. Thus, the E-UTRA cell and the UE do not know a difference of downlink timing references between the E-UTRA cell and the NR cell. The UE performs a measurement for detecting the SSB by using the SMTC information based on a downlink timing reference of the E-UTRA cell. Then, the UE may fail to detect the SSB of the NR cell because the UE does not know the difference of downlink timing references between the E-UTRA cell and the NR cell. Thus, the UE may fail to measure and report the SFTD between the NR cell and the E-UTRA cell. It can make problem for configuring the NR cell as PSCell (Primary SCell) because of not detecting downlink timing reference of the NR cell.

SUMMARY

Accordingly, a disclosure of the present specification has been made in an effort to solve the aforementioned problem.

Accordingly, a disclosure of the present specification has been made in an effort to solve the aforementioned problem.

In accordance with an embodiment of the present invention, a disclosure of the resent specification provides a method for measuring a frame timing difference. The method may be performed by a user equipment (UE) and comprises: based on (i) that an Evolved Universal Mobile Telecommunications System (UMTS) Terrestrial Radio Access (E-UTRA) cell is configured for a primary cell and based on (ii) that a secondary cell is not configured, measuring the frame timing difference between the E-UTRA cell and a New Radio (NR) cell based on a Synchronization Signal (SS)/Physical Broadcast Channel (PBCH) Block (SSB) Measurement Time Configuration (SMTC) period, wherein the NR cell is found regardless of a position of a SSB of the NR cell; and reporting a System Frame Number (SFN) and Frame Timing Difference (SFTD) based on the frame timing difference to the E-UTRA cell.

Based on that a measurement gap is not provided, the NR cell is found regardless of the position of the SSB of the NR cell in the SMTC period.

Based on that a measurement gap is provided, the NR cell is found based on a condition related to the SSB.

The method further comprises receiving SMTC information, which includes a length of the SMTC period, a duration of a SMTC window and a SMTC offset.

The frame timing difference is measured based on a difference of a time when a start of a radio frame received from the E-UTRA cell and a time when a start of a received radio frame from NR cell.

Based on that the UE includes a separated Radio Frequency (RF) receiver chain for the NR cell, the frame timing difference is measured based on shifting a time duration for measuring the SSB of the NR cell based on the length of the SMTC period and the duration of the SMTC window.

Based on that the UE includes a shared Radio Frequency (RF) receiver chain for the NR cell and the E-UTRA cell, the frame timing difference is measured based on a measurement gap offset, a measurement gap length (MGL) and a measurement gap periodicity.

The measurement gap offset is configured differently depending on a UE.

The method further comprises receiving the frame timing difference from the E-UTRA cell, based on that other UE has measured the frame timing difference based on the measurement offset which is configured differently from the UE.

In accordance with an embodiment of the present invention, a disclosure of the resent specification provides a user equipment (UE) for measuring a frame timing difference. The UE comprises a transceiver; and a processor operatively coupled to the transceiver, the processor is configured to: based on (i) that an Evolved Universal Mobile Telecommunications System (UMTS) Terrestrial Radio Access (E-UTRA) cell is configured for a primary cell based on (ii) that a secondary cell is not configured, measure the frame timing difference between the E-UTRA cell and a (New Radio) NR cell based on a Synchronization Signal (SS)/Physical Broadcast Channel (PBCH) Block (SSB) Measurement Time Configuration (SMTC) period, wherein the NR cell is found regardless of a position of a SSB of the NR cell; and control the transceiver to report a System Frame Number (SFN) and Frame Timing Difference (SFTD) based on the frame timing difference to the E-UTRA cell.

In accordance with an embodiment of the present invention, a disclosure of the resent specification provides a method for measuring a frame timing difference. The method performed by a base station (BS) and comprises: transmitting Synchronization Signal (SS)/Physical Broadcast Channel (PBCH) Block (SSB) Measurement Time Configuration (SMTC) information, which includes a length of the SMTC period, a duration of a SMTC window and a SMTC offset, to a user equipment (UE); and receiving a System Frame Number (SFN) and Frame Timing Difference (SFTD), which is based on a frame timing difference between the BS and a New Radio (NR) cell, from the UE, wherein based on (i) that the BS is configured for a primary cell for the UE based on (ii) that a secondary cell for the UE is not configured, the frame timing difference is measured based on the SMTC period by the UE wherein the NR cell is found by the UE regardless of a position of a SSB of the NR cell.

According to a disclosure of the present invention, the above problem of the related art is solved.

BRIEF DESCRIPTION OF THE FIGURES

FIG. 3 illustrates a procedure for cell detection and measurement.

FIG. 5 illustrates an example of a subframe type in NR.

FIG. 6 illustrates an example of an SS block in NR.

FIG. 10 illustrates examples of measuring a frame timing difference by a UE not using a measurement gap.

FIG. 11 illustrates examples of measuring a frame timing difference by a UE using a measurement gap.

DETAILED DESCRIPTION

Figure 1:
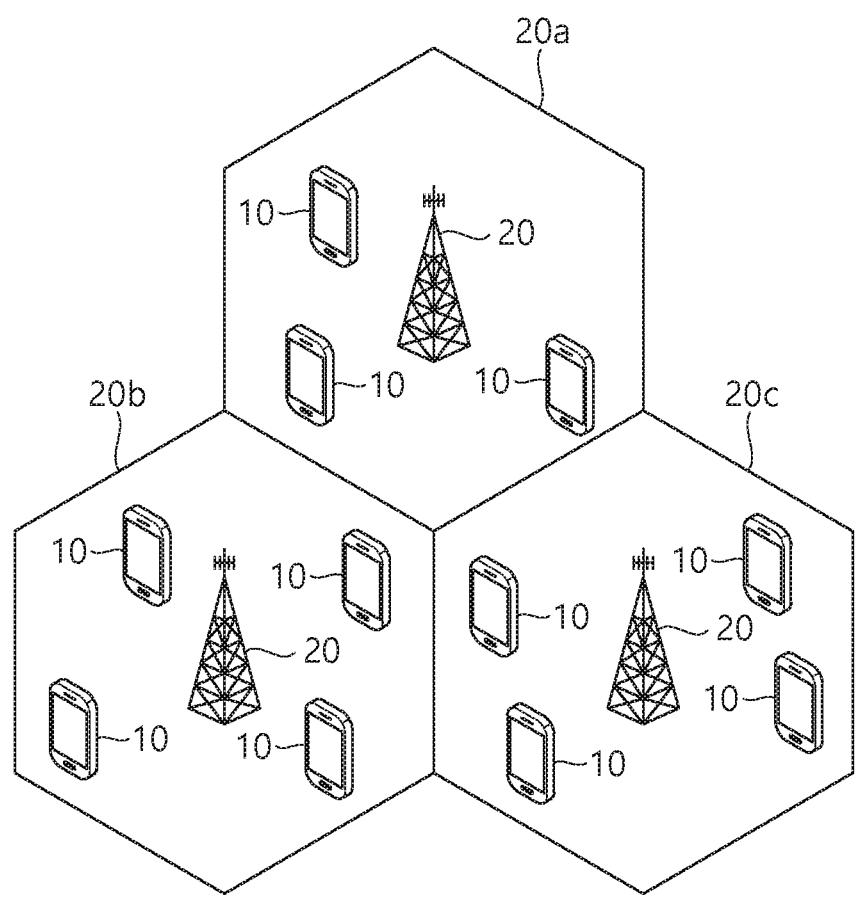
FIG. 1 is a wireless communication system.

Hereinafter, based on 3rd Generation Partnership Project (3GPP) long term evolution (LTE), 3GPP LTE-advanced (LTE-A) or 3GPP fifth-generation (so called 5G) mobile communication (a new radio access technology (New RAT or NR)), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), gNB (next generation NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
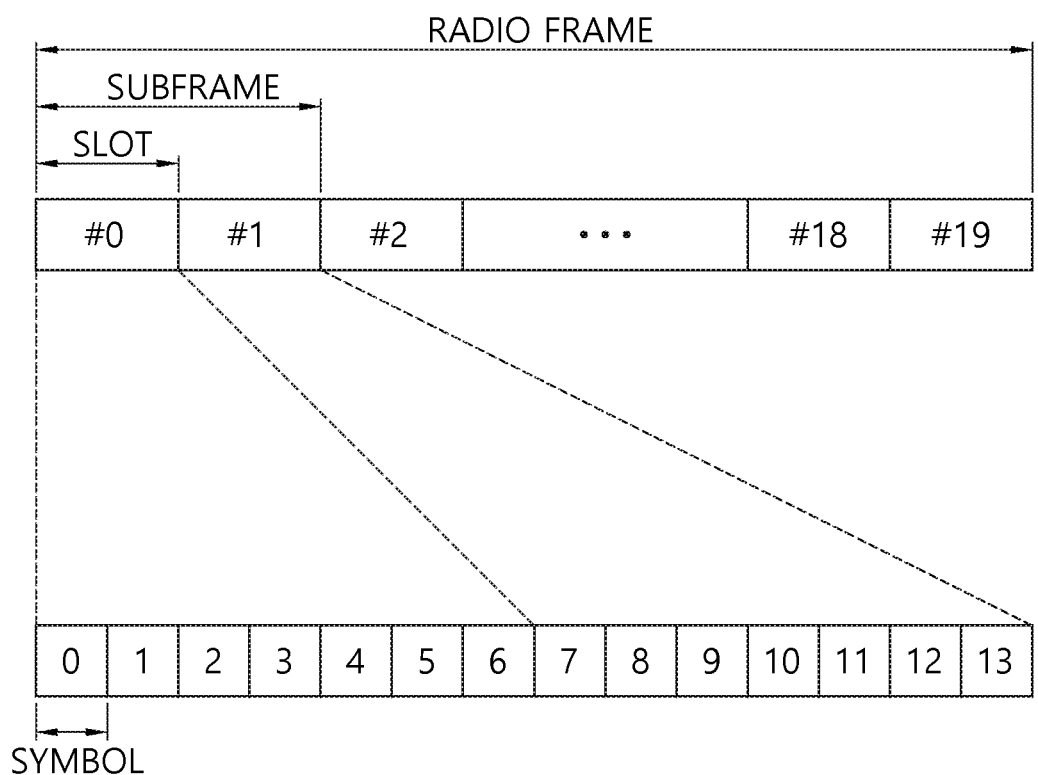
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

One slot includes NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

<Measurement and Measurement Report>

Supporting mobility of a UE 100 is essential in a mobile communication system. Thus, the UE 100 constantly measures a quality of a serving cell which is currently providing a service, and a quality of a neighbor cell. The UE 10 reports a result of the measurement to a network at an appropriate time, and the network provides optimal mobility to the UE through a handover or the like. Measurement for this purpose is referred to as a Radio Resource Management (RRM).

Meanwhile, the UE 100 monitors a downlink quality of a primary cell (PCell) based on a CRS. This is so called Radio Link Monitoring (RLM).

FIG. 3 shows a procedure for cell detection and measurement.

Referring to FIG. 3, a UE detects a neighbor cell based on Synchronization Signal (SS) which is transmitted from the neighbor cell. The SS may include a Primary Synchronization Signal (PSS) and a Secondary Synchronization Signal (SSS).

When the serving cell 200a and the neighbor cell respectively transmit Cell-specific Reference Signals (CRSs), the UE 100 measures the CRSs and transmits a result of the measurement to the serving cell 200a. In this case, the UE 100 may compare power of the received CRSs based on received information on a reference signal power.

At this point, the UE 100 may perform the measurement in the following three ways.

1) RSRP (reference signal received power): This represents an average reception power of all REs that carry the CRS which is transmitted through the whole bands. In this case, instead of the CRS, an average reception power of all REs that carry the CSI RS may also be measured.

2) RSS (received signal strength indicator): This represents a reception power which is measured through the whole bands. The RSSI includes all of signal, interference and thermal noise.

3) RSRQ (reference symbol received quality): This represents a CQI, and may be determined as the RSRP/RSSI according to a measured bandwidth or a sub-band. That is, the RSRQ signifies a signal-to-noise interference ratio (SINR). Since the RSRP is unable to provide a sufficient mobility, in handover or cell reselection procedure, the RSRQ may be used instead of the RSRP.

The RSRQ may be obtained by RSSI/RSSP.

Meanwhile, the UE 100 receives a radio resource configuration information element (IE) from the serving cell 100a for the measurement. The radio resource configuration information element (IE) is used to configure/modify/cancel a radio bearer or to modify an MAC configuration. The radio resource configuration IE includes subframe pattern information. The subframe pattern information is information on a measurement resource restriction pattern on the time domain, for measuring RSRP and RSRQ of a serving cell (e.g., PCell).

Meanwhile, the UE 100 receives a measurement configuration information element (IE) from the serving cell 100a for the measurement. A message including the measurement configuration information element (IE) is called a measurement configuration message. Here, the measurement configuration information element (IE) may be received through a RRC connection reconfiguration message. If the measurement result satisfies a report condition in the measurement configuration information, the UE reports the measurement result to a base station. A message including the measurement result is called a measurement report message.

The measurement configuration IE may include measurement object information. The measurement object information is information of an object which is to be measured by the UE. The measurement object includes at least one of an intra-frequency measurement object which is an object of intra-cell measurement, an inter-frequency measurement object which is an object of inter-cell measurement and an inter-RAT measurement object which is an object of inter-RAT measurement. For example, the intra-cell measurement object indicates a neighbor cell that has a frequency band which is identical to that of a serving cell, the inter-cell measurement object indicates a neighbor cell that has a frequency band which is different from that of a serving cell, and the inter-RAT measurement object indicates a neighbor cell of a RAT which is different from that of a serving cell.

TABLE 1

Measurement object field description
carrierFreq
This indicates an E-UTRA carrier frequency to which this configuration is applied.
measCycleSCell
This indicates a cycle for measurement of a secondary cell (SCell) in a non-activated state. Its value may be set to 40, 160, 256, etc. If the value is 160, it indicates that measurement is performed every 160 subframes.

Meanwhile, the measurement configuration IE includes an information element IE as shown in the following table.

TABLE 2

MeasConfig field description
allowInterruptions
If its value is True, it indicates that interruption of transmission and reception with a serving cell is allowed when measurement of subcarriers of an Scell in a non-active state is performed using MeasCycleScell.
measGapConfig
It indicates configuration or cancelation of a measurement gap.

The "measGapConfig" is used to configure or cancel a measurement gap (MG). The MG is a period for cell identification and RSRP measurement on an inter frequency different from that of a serving cell.

TABLE 3

MeasGapConfig field description
gapOffset
Any one of gp0 and gp1 may be set as a value of gapOffset. gp0 corresponds to a gapoffset of pattern ID "0" having MGRP = 40 ms. gp1 corresponds to a gapoffset of pattern ID "1" having MGRP = 80 ms.

TABLE 4

| Gap pattern Id | Measurement Gap Length (MGL) | Measurement Gap Repetition Period (MGRP) | Minimum available time for inter-frequency and inter-RAT measurements during 480 ms period |
|---|---|---|---|
| 0 | 6 ms | 40 ms | 60 ms |
| 1 | 6 ms | 80 ms | 30 ms |

When the UE requires a measurement gap to identify and measure a cell at an inter-frequency and inter-RAT, the E-UTRAN (i.e., the base station) may provide a single measurement gap (MG) pattern with a predetermined gap period to the UE. Without transmitting or receiving any data from the serving cell for the measurement gap period, the UE retunes its RF chain to be adapted to the inter-frequency and then performs measurement at the corresponding inter-frequency.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provided an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Introduction of Dual Connectivity (DC)>

Recently, a scheme for simultaneously connecting UE to different base stations, for example, a macro cell base station and a small cell base station, is being studied. This is called dual connectivity (DC).

In DC, the eNodeB for the primary cell (PCell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (PCell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

<Internet of Things (IoT) Communication>

Hereinafter, IoT will be described.

The IoT communication refers to the exchange of information between an IoT devices without human interaction through a base station or between the IoT device and a server through the base station. In this way, the IoT communication is also referred to as CIoT (Cellular Internet of Things) in that the IoT communication is performed through the cellular base station.

This IoT communication is a kind of machine type communication (MTC). Therefore, the IoT device may be referred to as an MTC device.

The IoT communication has a small amount of transmitted data. Further, uplink or downlink data transmission/reception rarely occurs. Accordingly, it is desirable to lower a price of the IoT device and reduce battery consumption in accordance with the low data rate. In addition, since the IoT device has low mobility, the IoT device has substantially the unchanged channel environment.

In one approach to a low cost of the IoT device, the IoT device may use, for example, a sub-band of approximately 1.4 MHz regardless of a system bandwidth of the cell.

The IoT communication operating on such a reduced bandwidth may be called NB (Narrow Band) IoT communication or NB CIoT communication.

<Next-Generation Mobile Communication Network>

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

The ITU suggests three usage scenarios, for example, enhanced Mobile BroadBand (eMBB), massive Machine Type Communication (mMTC), and Ultra Reliable and Low Latency Communications (URLLC).

URLLC relates to a usage scenario in which high reliability and low delay time are required. For example, services like autonomous driving, automation, and virtual realities requires high reliability and low delay time (for example, 1 ms or less). A delay time of the current 4G (LTE) is statistically 21-43 ms (best 10%), 33-75 ms (median). Thus, the current 4G (LTE) is not sufficient to support a service requiring a delay time of 1 ms or less. Next, eMBB relates to a usage scenario in which an enhanced mobile broadband is required.

That is, the fifth-generation mobile communication system aims to achieve a capacity higher than the current 4G LTE and is capable of increasing a density of mobile broadband users and support Device-to-Device (D2D), high stability, and Machine Type Communication (MTC). Researches on 5G aims to achieve reduced waiting time and less batter consumption, compared to a 4G mobile communication system, in order to implement the IoT. For the 5G mobile communication, a new radio access technology (New RAT or NR) may be proposed.

Figure 4A:
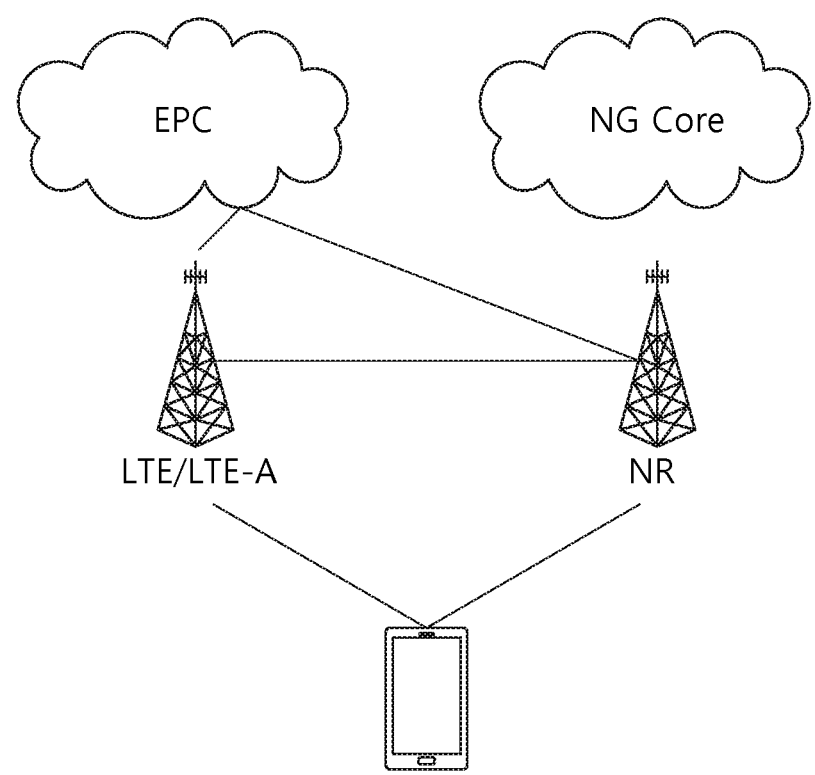
FIGS. 4A to 4C are diagrams illustrating exemplary architecture for a service of the next-generation mobile communication.
Figure 4B:
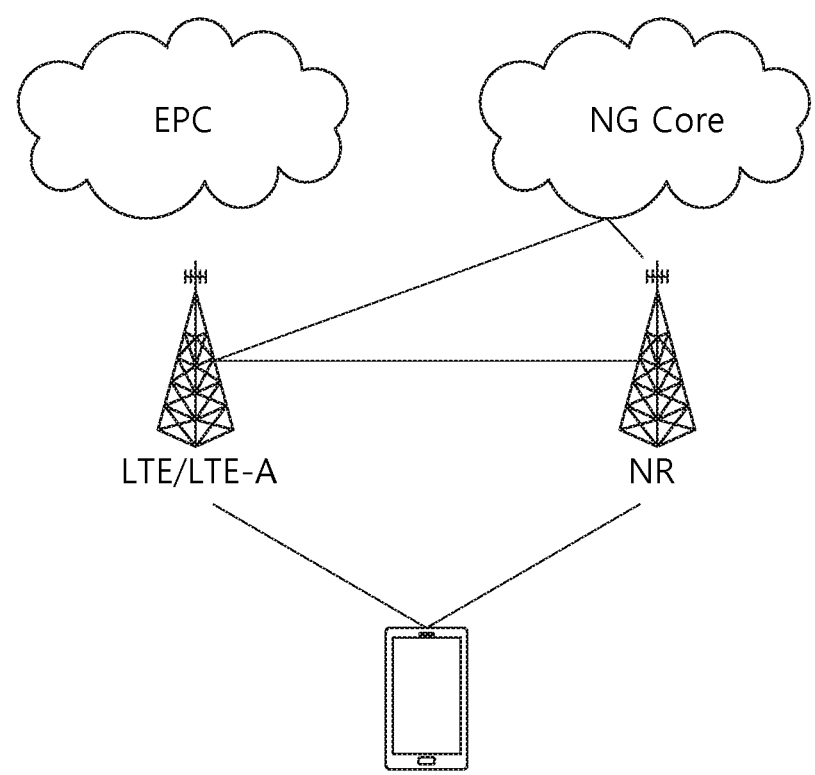
Figure 4C:
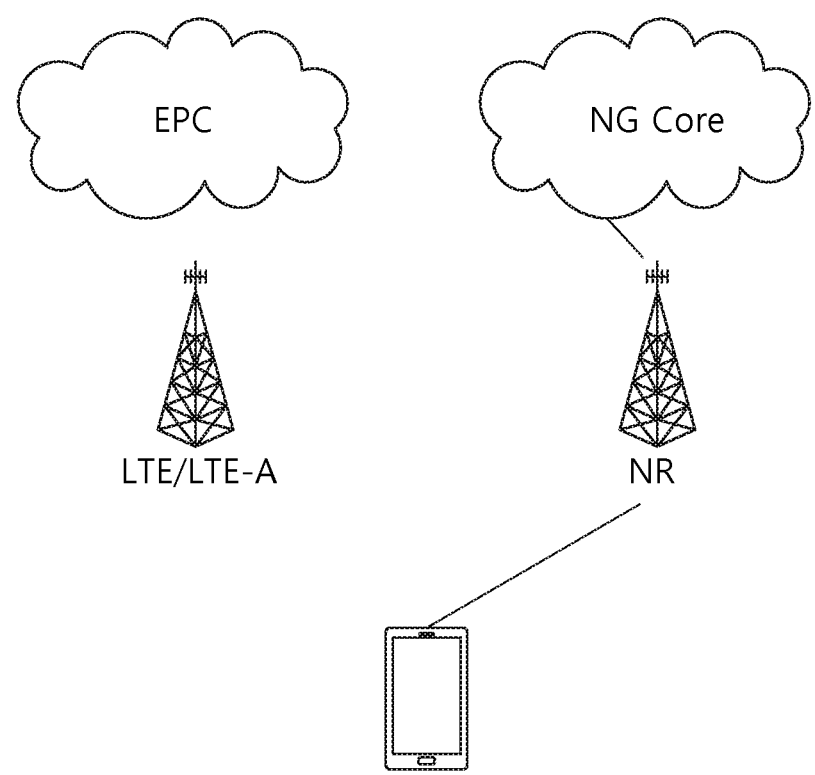

FIGS. 4A to 4C are diagrams illustrating exemplary architecture for a next-generation mobile communication service.

Referring to FIG. 4A, a UE is connected in dual connectivity (DC) with an LTE/LTE-A cell and a NR cell.

The NR cell is connected with a core network for the legacy fourth-generation mobile communication, that is, an Evolved Packet core (EPC).

Referring to FIG. 4B, the LTE/LTE-A cell is connected with a core network for 5th generation mobile communication, that is, a Next Generation (NG) core network, unlike the example in FIG. 4A.

A service based on the architecture shown in FIGS. 4A and 4B is referred to as a non-standalone (NSA) service.

Referring to FIG. 4C, a UE is connected only with an NR cell. A service based on this architecture is referred to as a standalone (SA) service.

Meanwhile, in the above new radio access technology (NR), using a downlink subframe for reception from a base station and using an uplink subframe for transmission to the base station may be considered. This method may be applied to paired spectrums and not-paired spectrums. A pair of spectrum indicates including two subcarrier for downlink and uplink operations. For example, one subcarrier in one pair of spectrum may include a pair of a downlink band and an uplink band.

FIG. 5 shows an example of subframe type in NR.

A transmission time interval (TTI) shown in FIG. 5 may be called a subframe or slot for NR (or new RAT). The subframe (or slot) in FIG. 5 may be used in a TDD system of NR (or new RAT) to minimize data transmission delay. As shown in FIG. 4, a subframe (or slot) includes 14 symbols as does the current subframe. A front symbol of the subframe (or slot) may be used for a downlink control channel, and a rear symbol of the subframe (or slot) may be used for a uplink control channel. Other channels may be used for downlink data transmission or uplink data transmission. According to such structure of a subframe (or slot), downlink transmission and uplink transmission may be performed sequentially in one subframe (or slot). Therefore, a downlink data may be received in the subframe (or slot), and a uplink acknowledge response (ACK/NACK) may be transmitted in the subframe (or slot). A subframe (or slot) in this structure may be called a self-constrained subframe. If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa. To this end, when downlink is transitioned to uplink in the subframe structure, some OFDM symbols may be set as a Guard Period (GP).

<Support of Various Numerologies>

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by $\mu$, a subcarrier spacing and a corresponding CP length may be expressed as shown in the following table.

TABLE 5

| $\mu$ | $\Delta f = 2^\mu \cdot 15$ [kHz] | CP |
|---|---|---|
| 0 | 15 | Normal |
| 1 | 30 | Normal |

TABLE 5-continued

| $\mu$ | $\Delta f = 2^\mu \cdot 15$ [kHz] | CP |
|---|---|---|
| 2 | 60 | Normal, Extended |
| 3 | 120 | Normal |
| 4 | 240 | Normal |

In the case of a normal CP, when an index of a numerology is expressed by $\mu$, the number of OLDM symbols per slot $N^{slot}_{symb}$, the number of slots per frame $N^{frame,\mu}_{slot}$, and the number of slots per subframe $N^{subframe,\mu}_{slot}$ are expressed as shown in the following table.

TABLE 6

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by $\mu$, the number of OLDM symbols per slot $N^{slot}_{symb}$, the number of slots per frame Nframe,μslot, and the number of slots per subframe Nsubframe,μslot are expressed as shown in the following table.

TABLE 7

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

Meanwhile, in the next-generation mobile communication, each symbol may be used for downlink or uplink, as shown in the following table. In the following table, uplink is indicated by U, and downlink is indicated by D. In the following table, X indicates a symbol that can be flexibly used for uplink or downlink.

TABLE 8

| | Symbol Number in Slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | X | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |

TABLE 8-continued

| Format | Symbol Number in Slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | X | U | U |
| 45 | D | D | D | D | D | D | X | X | U | U | U | U | U | U |
| 46 | D | D | D | D | D | D | X | D | D | D | D | D | D | X |
| 47 | D | D | D | D | D | X | X | D | D | D | D | D | X | X |
| 48 | D | D | X | X | X | X | X | D | D | X | X | X | X | X |
| 49 | D | X | X | X | X | X | D | X | X | X | X | X | X | X |
| 50 | X | U | U | U | U | U | U | X | U | U | U | U | U | U |
| 51 | X | X | U | U | U | U | U | X | X | U | U | U | U | U |
| 52 | X | X | X | U | U | U | U | X | X | X | U | U | U | U |
| 53 | X | X | X | X | U | U | U | X | X | X | X | U | U | U |
| 54 | D | D | D | D | X | U | D | D | D | D | D | X | U | U |
| 55 | D | D | X | U | U | U | D | D | X | U | U | U | U | U |
| 56 | D | X | U | U | U | U | D | X | U | U | U | U | U | U |
| 57 | D | D | D | X | X | U | D | D | D | X | X | U | U | U |
| 58 | D | D | X | X | U | U | D | D | X | X | U | U | U | U |
| 59 | D | X | X | U | U | U | D | X | X | U | U | U | U | U |
| 60 | D | X | X | X | X | U | D | X | X | X | X | U | U | U |
| 61 | D | D | X | X | X | X | U | D | D | X | X | X | X | U |

<Operating Band in NR>

Operating bands in NR are divided into FR 1 (Frequency Range 1) band and FR 2 band. FR 1 band includes a frequency band of 6 GHz or less, and FR 2 band includes a frequency band exceeding 6 GHz. FR 1 band and FR 2 band are shown in Table 9.

TABLE 9

| Frequency Range | Corresponding range of frequency |
|---|---|
| Frequency Range 1 (FR 1) | 450 MHz-6000 MHz |
| Frequency Range 2 (FR 2) | 24250 MHz-52600 MHz |

An operating band shown in Table 10 is a reframing operating band that is transitioned from an operating band of LTE/LTE-A. This operating band is referred to as FR1 band.

TABLE 10

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

The following table shows an NR operating band defined at high frequencies. This operating band is referred to as FR2 band.

TABLE 11

| NR Operating Band | Uplink Operating Band $F_{UL\_low}$-$F_{UL\_high}$ | Downlink Operating Band $F_{DL\_low}$-$F_{DL\_high}$ | Duplex Mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n259 | 37000 MHz-40000 MHz | 37000 MHz-40000 MHz | TDD |

Meanwhile, when the operating band shown in the above table is used, a channel bandwidth is used as shown in the following table.

TABLE 12

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ |
|---|---|---|---|---|---|---|---|---|---|---|---|
| 15 | 25 | 52 | 79 | 106 | 133 | [160] | 216 | 270 | N/A | N/A | N/A |
| 30 | 11 | 24 | 38 | 51 | 65 | [78] | 106 | 133 | 162 | 217 | 273 |
| 60 | N/A | 11 | 18 | 24 | 31 | [38] | 51 | 65 | 79 | 107 | 135 |

In the above table, SCS indicates a subcarrier spacing. In the above table, NRB indicates the number of RBs.

Meanwhile, when the operating band shown in the above table is used, a channel bandwidth is used as shown in the following table.

TABLE 13

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

<SS Block in NR>

In the 5G NR, information required for a UE to perform an initial access, that is, a Physical Broadcast Channel (PBCH) including a Master Information Block (MIB) and a synchronization signal (SS) (including PSS and SSS) are defined as an Synchronization Signal (SS)/Physical Broadcast Channel (PBCH) Block (SS block, SSB). In addition, a plurality of SS blocks may be grouped and defined as an SS burst, and a plurality of SS bursts may be grouped and defined as an SS burst set. It is assumed that each SS block is beamformed in a particular direction, and various SS blocks existing in an SS burst set are designed to support UEs existing in different directions.

FIG. 6 is a diagram illustrating an example of an SS block in NR.

Referring to FIG. 6, an SS burst is transmitted in every predetermined periodicity. Accordingly, a UE receives SS blocks, and performs cell detection and measurement.

Meanwhile, in the 5G NR, beam sweeping is performed on an SS. A detailed description thereof will be provided with reference to FIG. 7.

Figure 7:
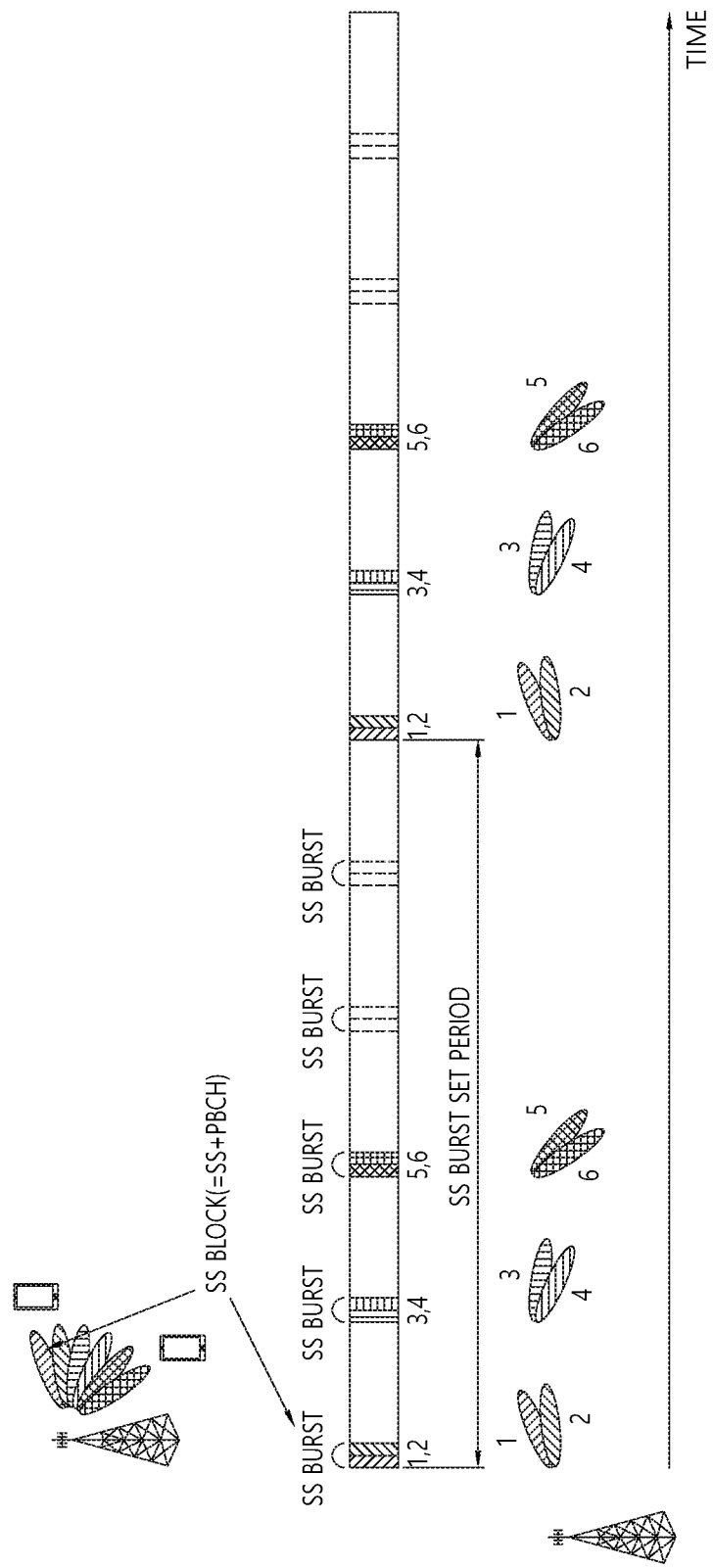
FIG. 7 illustrates an example of beam sweeping in NR.

FIG. 7 is a diagram illustrating an example of beam sweeping in the NR.

A base station transmits each SS block in an SS burst over time while performing beam sweeping. In this case, multiple SS blocks in an SS burst set are transmitted to support UEs existing in different directions. In FIG. 6, the SS burst set includes one to six SS blocks, and each SS burst includes two SS blocks.

<Channel Raster and Sync Raster>

Hereinafter, a channel raster and a sync rater will be described.

A frequency channel raster is defined as a set of RF reference frequencies ($F_{REF}$). An RF reference frequency may be used as a signal indicative of locations of an RF channel, an SS block, and the like.

A global frequency raster may be defined with respect to all frequencies from 0 GHz to 100 GHz. The granularity of the global frequency raster may be expressed by $\Delta_{F_{Global}}$.

An RF reference frequency is designated by NR Absolute Radio Frequency Channel Number (NR-AFRCN) in the global frequency raster's range (0 ... 2016666). A relationship between the NR-AFRCN and the RF reference frequency ($F_{REF}$) of MHz may be expressed as shown in the following equation. Here, $F_{REF-Offs}$ and $N_{Ref-Offs}$ are expressed as shown in the following Table.

$$F_{REF} = F_{REF-Offs} + \Delta_{F_{Global}}(N_{REF} - N_{REF-Offs}) \quad \text{[Equation 1]}$$

TABLE 14

| Frequency Range (MHz) | $\Delta F_{Global}$ (kHz) | $F_{REF-Offs}$ (MHz) | $N_{REF-Offs}$ | Range of $N_{REF}$ |
|---|---|---|---|---|
| 0-3000 | 5 | 0 | 0 | 0-599999 |
| 3000-24250 | 15 | 3000 | 600000 | 600000-2016666 |
| 24250-100000 | 60 | 24250.08 | 2016667 | 2016667-3279165 |

A channel raster indicates a subset of FR reference frequencies able to be used to identify location of an RF channel in uplink and downlink. An RF reference frequency for an RF channel may be mapped to a resource element on a subcarrier.

Mapping of the RF reference frequency of the channel raster and the corresponding resource element may be used to identify a location of an RF channel. The mapping may differ according to a total number of RBs allocated to the channel, and the mapping applies to both uplink (UL) and downlink (DL).

When NRB mod 2=0,
the RE index k is 0, and
the number of PRBs is as below.

$$n_{PRB} = \left\lfloor \frac{N_{RB}}{2} \right\rfloor$$

When NRB mod 2=0,
the RE index k is 6,
the number of PRBs is as below.

$$n_{PRB} = \left\lfloor \frac{N_{RB}}{2} \right\rfloor$$

Locations of RF channels of a channel raster in each NR operating band may be expressed as shown in the following table.

TABLE 15

| NR Operating Band | Δ $F_{Raster}$ (kHz) | Uplink Frequency Range of $N_{REF}$ (First-<Step size>-Last) | Uplink Frequency Range of $N_{REF}$ (First-<Step size>-Last) |
|---|---|---|---|
| n1 | 100 | 384000-<20>-396000 | 422000-<20>-434000 |
| n2 | 100 | 370000-<20>-382000 | 386000-<20>-398000 |
| n3 | 100 | 342000-<20>-357000 | 361000-<20>-376000 |
| n5 | 100 | 164800-<20>-169800 | 173800-<20>-178800 |
| n7 | 100 | 500000-<20>-514000 | 524000-<20>-538000 |
| n8 | 100 | 176000-<20>-183000 | 185000-<20>-192000 |
| n12 | 100 | 139800-<20>-143200 | 145800-<20>-149200 |
| n20 | 100 | 166400-<20>-172400 | 158200-<20>-164200 |
| n25 | 100 | 370000-<20>-383000 | 386000-<20>-399000 |
| n28 | 100 | 140600-<20>-149600 | 151600-<20>- 160600 |
| n34 | 100 | 402000-<20>-405000 | 402000-<20>-405000 |
| n38 | 100 | 514000-<20>-524000 | 514000-<20>-524000 |
| n39 | 100 | 376000-<20>-384000 | 376000-<20>-384000 |
| n40 | 100 | 460000-<20>-480000 | 460000-<20>-480000 |
| n41 | 15 | 499200-<3>-537999 | 499200-<3>-537999 |
|  | 30 | 499200-<6>-537996 | 499200-<6>-537996 |
| n51 | 100 | 285400-<20>-286400 | 285400-<20>-286400 |
| n66 | 100 | 342000-<20>-356000 | 422000-<20>-440000 |
| n70 | 100 | 339000-<20>-342000 | 399000-<20>-404000 |
| n71 | 100 | 132600-<20>-139600 | 123400-<20>-130400 |
| n75 | 100 | N/A | 286400-<20>-303400 |
| n76 | 100 | N/A | 285400-<20>-286400 |
| n77 | 15 | 620000-<1>-680000 | 620000-<1>-680000 |
|  | 30 | 620000-<2>-680000 | 620000-<2>-680000 |
| n78 | 15 | 620000-<1>-653333 | 620000-<1>-653333 |
|  | 30 | 620000-<2>-653332 | 620000-<2>-653332 |
| n79 | 15 | 693334-<1>-733333 | 693334-<1>-733333 |
|  | 30 | 693334-<2>-733332 | 693334-<2>-733332 |
| n80 | 100 | 342000-<20>-357000 | N/A |
| n81 | 100 | 176000-<20>-183000 | N/A |
| n82 | 100 | 166400-<20>-172400 | N/A |
| n83 | 100 | 140600-<20>-149600 | N/A |
| n84 | 100 | 384000-<20>-396000 | N/A |
| n86 | 100 | 342000-<20>-356000 | N/A |

TABLE 16

| NR Operating Band | Δ $F_{Raster}$ (kHz) | Uplink and Downlink Frequency Range (First-<Step size>-Last) |
|---|---|---|
| n257 | 60 | 2054166-<1>-2104165 |
|  | 120 | 2054167-<2>-2104165 |
| n258 | 60 | 2016667-<1>-2070832 |
|  | 120 | 2016667-<2>-2070831 |
| n260 | 60 | 2229166-<1>-2279165 |
|  | 120 | 2229167-<2>-2279165 |
| n261 | 60 | 2070833-<1>-2084999 |
|  | 120 | 2070833-<2>-2087497 |

Meanwhile, a sync raster indicates a frequency location of an SS block used by a UE to acquire system information. The frequency location of the SS block may be defined as SSREF using a GSCN number corresponding thereto FIG. 8 shows an example of performing measurement in EN (E-UTRA and NR) DC case.

Figure 8:
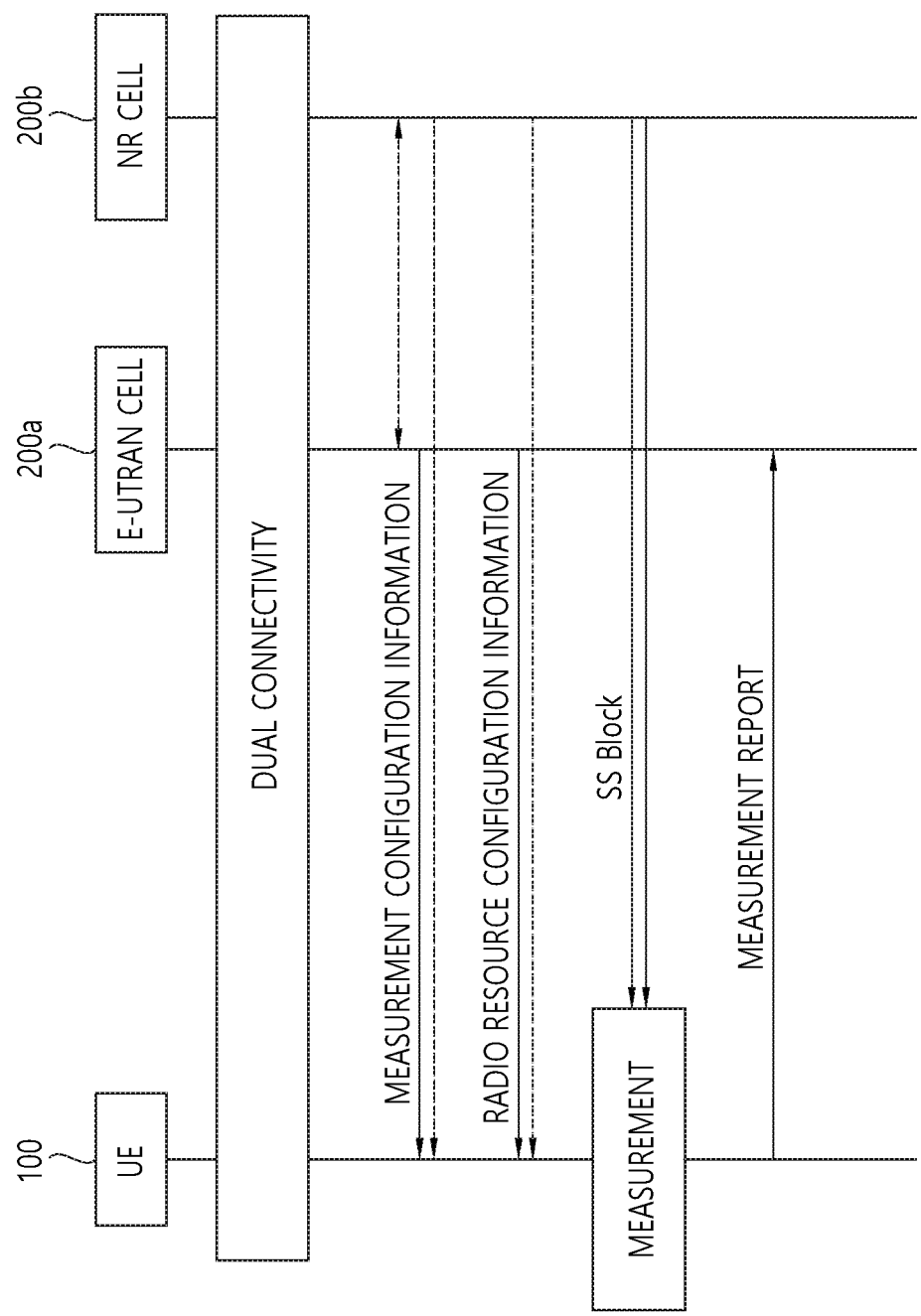
FIG. 8 illustrates an example of performing measurement in an EN (E-UTRA and NR)-DC case.

Referring to FIG. 8, the UE 100 are connected in EN-DC with an E-UTRA (that is, LTE/LTE-A) cell. Here, a PCell in EN-DC may be an E-UTRA (that is, LTE/LTE-A) cell, and a PSCell in EN-DC may be an NR cell.

The UE 100 may receive measurement configuration (or "measconfig") information element (IE) of the E-UTRA (that is, LTE/LTE-A) cell. The measurement configuration (or "measconfig") IE received from the E-UTRA (that is, LTE/LTE-A) cell may further include fields shown in the following table, in addition to the fields shown in Table 2.

TABLE 17

MeasConfig field description
fr1-Gap
This field exists when a UE is configured with EN-DC. This field indicates whether a gap is applied to perform measurement on FR1 band (that is, a band shown in Table 9).
mgta
It indicates whether to apply a timing advance (TA) of 0.5 ms for a measurementgap configuration provided by the E-UTRAN.

The measurement configuration (or "measconfig") IE may further include a measGapConfig field for setting a measurement gap (MG), as shown in Table 2.

A gapoffset field within the measGapConfig field may further include gp4, gp5, . . . , gp11 for EN-DC, in addition to the example shown in Table 3.

Meanwhile, the UE 100 may receive a measurement configuration ("measconfig") IE of an NR cell, which is a PSCell, directly from the NR cell or through the E-UTRA cell which is a PCell.

Meanwhile, the measurement configuration ("measconfig") IE of the NR cell may include fields as shown in the following table.

TABLE 18

MeasConfig field description
measGapConfig
It indicates configuration or cancelation of a measurement gap
s-MeasureConfig
It indicates a threshold value for measurement of NR SpCell RSRP when a UE needs to perform measurement on a non-serving cell.

The above measGapConfig may further include fields as shown in the following table.

TABLE 19

MeasGapConfig field description
gapFR2
It indicates a measurement gap configuration applicable for FR2 frequency range.
gapOffset
It indicates a gap offset of a gap pattern with an MGRP.
mgl
It indicates a measurement gap length by ms. There may be 3 ms, 4 ms, 6 ms, etc.
mgrp
It indicates a measurement gap repetition period by ms.
mgta
It indicates whether to apply a timing advance (TA) of 0.5 ms for a measurement gap configuration.

Meanwhile, as shown in the drawing, the UE 100 receives a radio resource configuration information element (IE) of the E-UTRA (that is, LTE/LTE-A) cell which is a PCell. In addition, the UE may receive a radio resource configuration IE of an NR cell, which is a PSCell, from the NR cell or through the E-UTRA cell which is a PCell. The radio resource configuration IE includes subframe pattern information, as described above with reference to FIG. 3.

The UE 100 performs measurement and reports a measurement result. Specifically, the UE 100 interrupts data transmission and reception with the E-UTRA (that is, LTE/LTE-A) cell during the measurement gap, retunes its own RF chain, and performs measurement based on receipt of an SS block from an NR cell.

Figure 9A:
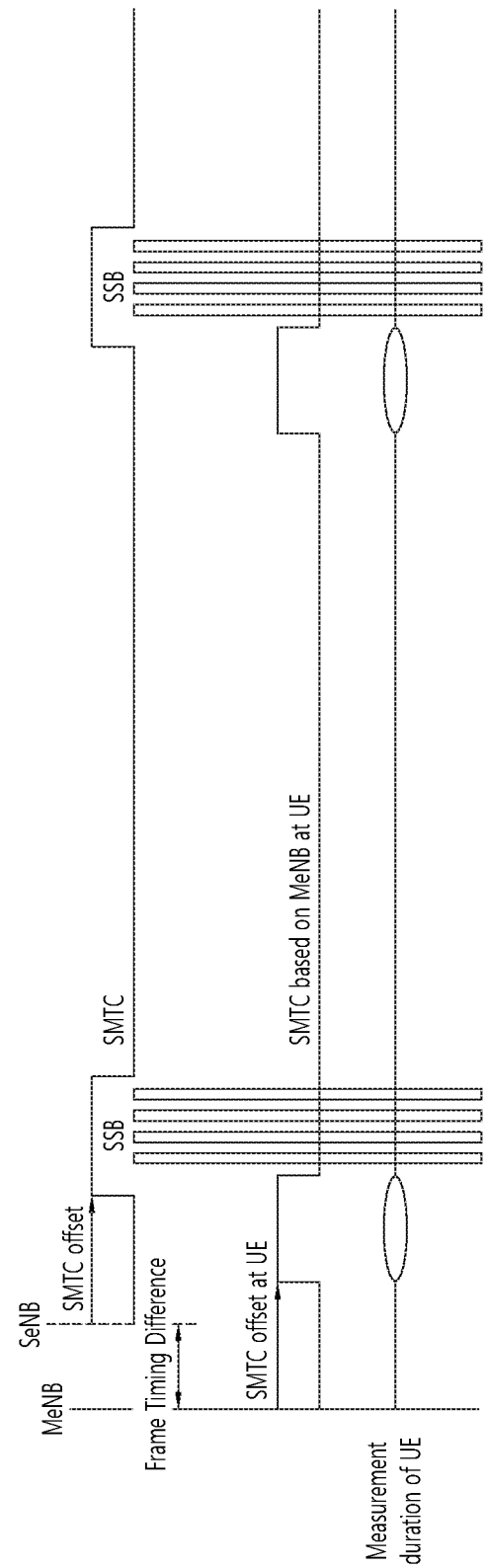
FIG. 9A illustrates a first example of problems in asynchronous EN-DC.
Figure 9B:
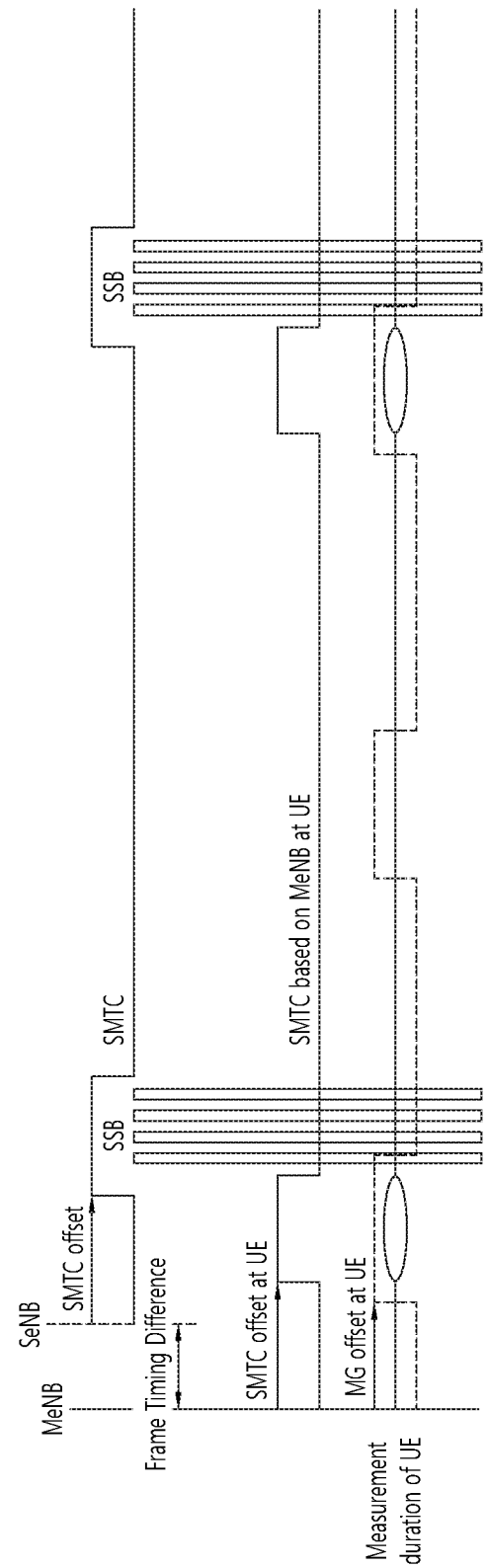
FIG. 9B illustrates a second example of problems in asynchronous EN-DC.

FIG. 9A illustrates a first example of problems in asynchronous EN-DC. FIG. 9B illustrates a second example of problems in asynchronous EN-DC.

In asynchronous EN-DC, MeNB, which is an E-UTRA cell configured as a primary cell for a UE, does not know difference between downlink (DL) timing references of the E-UTRA cell and the NR cell. Thus, a length of a SMTC period, a duration of a SMTC window and a SMTC offset are applied to the UE's measurement based on a DL reference of the E-UTRA cell. Due to the difference between DL timing references of the E-UTRA cell and the NR cell, the UE cannot detect the NR cell when SSBs of the NR cell are not located in the SMTC window of the UE.

Hereinafter, Master eNB (MeNB) refers to an E-UTRA cell configured as a primary cell (PCell). Secondary eNB (SeNB) refers to a NR cell, and SeNB may be replaced by Secondary gNB (SgNB). gNB refers to next generation NodeB.

A UE of FIG. 9A includes a separated RF receiver chain for a communication with the NR cell. The UE of FIG. 9A does not use a measurement gap (MG) for measuring SSB from the NR cell. Due to the difference between DL timing references of the E-UTRA cell and the NR cell, SSBs transmitted from the NR cell are not located in the SMTC window of the UE. Thus, even though the UE performs measurements periodically for detecting the NR cell, the UE fails to detect the NR cell. The UE cannot measure the frame timing difference between the E-UTRA cell and the NR cell. Then the UE cannot measure SFTD based on the frame timing difference and cannot report the SFTD to the E-UTRA cell. It can make problem for configuring the NR cell as PSCell (Primary SCell) because of not detecting downlink timing reference of the NR cell.

A UE of FIG. 9B includes a shared RF receiver chain for the communication with the NR cell. The UE of FIG. 9B needs a MG for measuring SSB from the NR cell. The MG is configured by the E-UTRA cell based on the DL timing reference of the E-UTRA cell. The UE performs measurements to detect the NR cell based on the MG. Due to the difference between DL timing references of the E-UTRA cell and the NR cell, SSBs transmitted from the NR cell are not located in the SMTC window of the UE. Thus, even though the UE performs measurements periodically on the MG for detecting the NR cell, the UE fails to detect the NR cell. The UE cannot measure the frame timing difference between the E-UTRA cell and the NR cell. Then the UE cannot measure SFTD based on the frame timing difference and cannot report the SFTD to the E-UTRA cell. It can make problem for configuring the NR cell as PSCell (Primary SCell) because of not detecting downlink timing reference of the NR cell.

As explained above with FIGS. 9A and 9B, there are problems that the UE may fail to measure and report the SFTD between the NR cell and the E-UTRA cell. Thus, the UE may fail to measure and report the SFTD between the NR cell and the E-UTRA cell in asynchronous EN-DC. It can make problem for configuring the NR cell as PSCell (Primary SCell) because of not detecting downlink timing reference of the NR cell.

<Disclosure of the Present Specification>

A UE supporting EN-DC performs SFTD measurement. SFTD between an E-UTRA PCell and an NR PSCell is defined as comprising SFN offset and frame boundary offset, which is equal to a frame timing difference of the present specification.

The SFN offset is defined as below.

$$\text{SFN offset} = (\text{SFN}_{PCell} - \text{SFN}_{PSCell}) \bmod 1024$$

Where $\text{SFN}_{PCell}$ is a SFN of the E-UTRA PCell radio frame and $\text{SFN}_{PSCell}$ is a SFN of the NR PSCell radio frame. The NR PSCell radio frame is a radio frame of which the UE receives the start of the radio frame closes to the time when the UE receives the start of the E-UTRA PCell radio frame. In addition, $\text{SFN}_{Cell}$ is included in MIB, which is transmitted on PBCH from the E-UTRA cell. And $\text{SFN}_{PSCell}$ is included in MIB, which is transmitted on SSB from the NR cell.

The frame boundary offset is defined as below.

$$\text{Frame boundary offset} = \lfloor (T_{FrameBoundaryPCell} - T_{FrameBoundaryPSCell})/5 \rfloor$$

Where $T_{FrameBoundaryPCell}$ is the time when the UE receives the start of a radio frame from the E-UTRA PCell, $T_{FrameBoundaryPSCell}$ is the time when the UE receives the start of a radio frame from the NR PSCell. $\lfloor \ \rfloor$ is a floor function (greatest integer function).

The radio frame from the NR PSCell is a radio frame closest in time domain to the radio frame received from the E-UTRA PCell. A unit of $T_{FrameBoundaryPCell} - T_{FrameBoundaryPSCell}$ is Ts, where Ts is a basic time unit. For example, Ts is 1/(15000*2048) seconds.

An event for SFTD measurement of the UE may be triggered by an information element (IE) related to SFTD received from the E-UTRA cell. For example, the IE related to SFTD may be reportSFTD-Meas. reportSFTD-Meas may be included in an IE related to a report configuration for inter-RAT also received from the E-UTRA cell, for example, ReportConfignterRAT.

Operations performed by the UE based on reportSFTD-Meas may be defined as below:
If this field is set topSCell, the UE shall measure SFTD between the PCell and the PSCell.
If the field is set to neighborCells, the UE shall measure SFTD between the PCell and the NR cells included in cellsForWhichToReportSFTD, which is an IE informs cells that the UE needs to measure and report SFTD, (if configured in the corresponding measObjectNR, which is an IE informs measurement objects) or between the PCell and up to 3 strongest detected NR cells (if cellsForWhichToReportSFTD is not configured in the corresponding measObjectNR).
E-UTRAN only includes this field when setting triggerType to periodical and purpose to reportStrongestCells. If included, the UE shall ignore the triggerType and maxReportCells fields Measured SFTD may be included in an information element (IE) MeasResultCellSFTD. The IE MeasResultCellSFTD consists of SFN and radio frame boundary difference between the PCell and an NR cell. For example, MeasResultCellSFTD can be defined as the following Table 20.

TABLE 20

```
-- ASN1START
MeasResultCellListSFTD-r15 ::=    SEQUENCE (SIZE (1...maxCellSFTD)) OF
                                  MeasResultCellSFTD-r15
MeasResultCellSFTD-r15 ::=        SEQUENCE {
    physCellId-r15                        PhysCellIdNR-r15,
```

TABLE 20-continued

```
    sfn-OffsetResult-r15              INTEGER (0..1023),
    frameBoundaryOffsetResult-r15        INTEGER (-30720..30719),
    rsrpResult-r15                 RSRP-RangeNR-r15 OPTIONAL
}
-- ASN1STOP
```

Where PhysCellId informs the physical layer identity (PCI) of an NR cell, sfn-OffsetResult informs the SFN difference between the PCell and the NR cell as an integer value, frameBoundaryOffsetResult informs the frame boundary difference between the PCell and the NR cell as an integer value, and rsrpResult informs Measured RSRP result of an NR cell.

Requirements for the SFTD measurement

When Discontinuous Reception (DRX) is not used in either of PCell and PSCell, the physical layer measurement period of the SFTD measurement shall be $T_{measure\_SFTD1} = $ [max(200,[5]×SMTC period)] ms.

When DRS is used in either of the of the E-UTRA PCell or the NR PSCell, or in both PCell and PSCell, the physical layer measurement period ($T_{measure\_SFTD1}$) of the SFTD measurement shall be as specified in Table 21.

TABLE 21

| DRX cycle length | $T_{measure\_SFTD1}$ (s) |
|---|---|
| DRX cycle ≤ 0.04 | [max(0.2, [5] × SMTC period)] |
| 0.04 < DRX cycle ≤ 0.32 | [8 × max(DRX cycle, SMTC period)] |
| 0.32 < DRX cycle ≤ 10.24 | [5 × DRX cycle] |

For DRX cycle ≤0.04, number of DRX cycles depends upon the DRX cycle in use.

DRX cycle length in this table refers to the DRX cycle length configured for PCell or PSCell. When DRX is used in both PCell and PSCell, DRX cycle length in Table 20 refers to the longer of the DRX cycle lengths for PCell and PSCell.

If PCell is changed without changing Primary Component Carrier (PCC), and/or if PSCell is changed without changing carrier frequency of PSCell, while the UE is performing SFTD measurements, the UE shall still meet SFTD measurement and accuracy requirements for the new PCell and/or PSCell. In this case the UE shall restart the SFTD measurement, and the total physical layer measurement period shall not exceed $T_{measure\_SFTD2}$ as defined by the following equation.

$$T_{measure\_SFTD2} = (N+M+1)*(T_{measure\_SFTD1}) + N*T_{PCell\_change\_ENDC} + M*T_{PSCell\_change\_ENDC}$$ [Equation 2]

where:
N is the number of times the E-UTRA PCell is changed over the measurement period ($T_{measure\_SFTD2}$),
M is the number of times the NR PSCell is changed over the measurement period ($T_{measure\_SFTD2}$),
$T_{PCell\_change\_ENDC}$ is the time necessary to change the PCell; it can be up to 25 ms,
$T_{PSCell\_change\_ENDC}$ is the time necessary to change the PSCell; it can be up to [25] ms.

Assumptions for Asynchronous EN-DC

In asynchronous EN-DC, when an E-UTRA cell is configured as a PCell and when a primary second cell (PSCell) is not configured yet, the following four assumptions may be considered. A NR cell may be configured as the PSCell if the UE measures SSB transmitted from the PSCell.

1) The E-UTRA cell (the PCell, MeNB) does not know a difference of DL timing reference between the E-UTRA cell and the NR cell, which is a cell can be configured as the PSCell. A DL timing reference is a reference used for configuration related to timing of the E-UTRA cell or the NR cell. A DL timing reference of the E-UTRA cell refers to $T_{E-UTRA\_DL\_REF}$. A DL timing reference of the NR cell refers to $T_{NR\_DL\_REF}$.

2) The E-UTRA cell may get SMTC information from the NR cell. The SMTC information includes a length of a SMTC period, a duration of a SMTC window and a SMTC offset. The SMTC period length is a time length of one SMTC cycle. The duration of the SMTC window is a time period that the UE performs measurements related to SSB. The SMTC offset is an offset of the SMTC window to the DL timing reference of the NR cell. Note that a timing reference of the SMTC offset is the DL timing reference of the NR cell, not the DL timing reference of the E-UTRA cell. The UE performs measurements based on SMTC window. The SMTC window starts on after the SMTC offset from the DL timing reference of the E-UTRA cell, lasts for the SMTC window duration and repeats based on the SMTC period length. Thus, the UE may not know exact location of the SSB transmitted from the NR cell in time because the UE cannot get information related to the DL timing reference of the NR cell.

3) The E-UTRA cell receives NR carrier frequency information from the NR cell and transmits the NR carrier frequency information to the UE.

4) SMTC window duration based on the SMTC information and the DL reference timing of the NR cell always includes SSB transmitted from the NR cell. In contrast, SMTC window duration, which is informed by the E-UTRA cell, used by the UE based on the SMTC information and the DL reference timing of the E-UTRA cell does not ensure to include SSB transmitted from the NR cell.

In the disclosure of this specification, a UE measures a frame timing difference between an E-UTRA cell and a NR cell based on a SMTC period, based on that the E-UTRA cell is configured for a primary cell and based on that a secondary cell is not configured. As the UE detect PSS, SSS from the SSB and decode PBCH, the UE measures the frame timing difference. As the UE receives PBCH including a SFN of the E-UTRA cell and SSB including a SFN of the NR cell, the UE measure SFN offset between the E-UTRA cell and the NR cell. The NR cell is found by the UE regardless of a position of a SSB of the NR cell. The UE reports the SFTD based on the frame timing difference to the primary cell. In detail, the UE measure the SFTD based on the SFN offset and the frame timing difference, and the UE reports the SFTD to the primary cell, which is the E-UTRA cell.

In detail, when the UE does not use a MG, the frame timing difference is measured based on shifting a time duration for measuring the SSB of the NR cell based on the length of the SMTC period and the duration of the SMTC window. When the UE uses the MG, the MG offset is configured differently depending on a UE and a UE detecting the NR cell based on the SSB reports the SFTD to the E-UTRA cell.

Operations of the UE, the E-UTRA cell and the NR cell will be described in more detail with reference to FIGS. 10-16.

FIG. 10 illustrates examples of measuring a frame timing difference by a UE not using a measurement gap.

The UE in FIG. 10 includes a separated RF receiver chain for a communication with a NR cell (SeNB). Thus the UE does not need the MG for inter-RAT SFTD measurement. The UE may measure a frame timing difference between an E-UTRA cell (MeNB) and the NR cell, which is found by the UE regardless of a position of a SSB.

In FIG. 10, SSBs transmitted from the NR cell are located in a SMTC window configured by the NR cell. The SMTC window starts at a time after the SMTC offset is passed from the DL timing reference of the NR cell. The SMTC window lasts for the duration of the SMTC window and repeats after the length of the SMTC period passes.

After the UE receives a SMTC information from the E-UTRA cell, the UE performs detection and measurements for the SSBs transmitted from the NR cell based on the SMTC information and a DL timing reference of the E-UTRA cell. SMTC windows based on the SMTC information and the DL timing reference of the E-UTRA cell are shown in FIG. 10.

The SMTC window is configured based on the DL timing reference of the E-UTRA cell with the SMTC offset and {SMTC window duration (which is equal to a duration of a SMTC window), SMTC periodicity (which is equal to a length of a SMTC period)}. {SMTC window duration, SMTC periodicity} may be expressed as {N, M} ms.

The UE may perform measurements for the frame timing difference based on the SMTC information received from the E-UTRA cell. In detail, the UE measures the frame timing difference based on shifting a SMTC window, which includes a time duration, for measuring the SSB of the NR cell based on the SMTC information. 5 examples are provided with FIG. 10 as below.

Example 1

The UE measures the frame timing difference based on a SMTC window which is configured based on the DL timing reference of the E-UTRA cell and the SMTC information. The measurement duration of the UE is located in the SMTC window.

There is a probability that a detection of the NR cell fails if any SSB transmitted from the NR cell is not located in the SMTC window based on the DL timing reference of the E-UTRA cell.

Example 2

The UE measures the frame timing difference based on shifting the SMTC window by 0, N, 2*N, . . . , M−N when each SMTC period passes. Thus, the measurement duration of the UE is shifted as the duration of the SMTC window for every SMTC period. The NR cell may be detected by the UE regardless of the position of the SSB.

Cell detection time regarding a worst case (the SSB of the NR cell is located after (M−N) ms from a start of the SMTC period) is $\lceil M/N \rceil$*M ms.

Example 3

The UE measures the frame timing difference based on shifting the SMTC window by one half duration of the SMTC window such as 0, N/2, N . . . . M−3N/2, M−N when each SMTC period passes. Thus, the measurement duration of the UE is shifted as one half of the duration of the SMTC window for every SMTC period. The NR cell may be detected by the UE regardless of the position of the SSB.

Cell detection time regarding a worst case (the SSB of the NR cell is located after (M−N) ms from a start of the SMTC period) is $\lceil M/N \rceil$*M ms.

Probability of the cell detection of Example 3 is expected to be higher than that of Example 2. It is because that when time period of SSBs overlaps with a half of SMTC window of Example 2, there is a less possibility to fail for detecting the SSBs in measurements of Example 3 comparing to that of Example 2.

Example 4

The UE measures the frame timing difference based on every time interval of SMTC window duration. That is, the measurement duration of the UE repeats periodically right after one measurement duration passed. In Example 4, there are a plurality of SMTC window shifted by the duration of the SMTC window in one SMTC period. The NR cell may be detected by the UE regardless of the position of the SSB.

Cell detection time regarding a worst case (the SSB of the NR cell is located after (M−N) ms from a start of the SMTC period) is SMTC periodicity (M) ms.

Example 5

The UE measures the frame timing difference based on every time interval of SMTC window duration and after one SMTC period passes, SMTC windows in next SMTC periods are all shifted by one half of the duration of the SMTC window. That is, the measurement duration of the UE repeats periodically right after one measurement duration passed and the measurement duration of the UE in each SMTC period is shifted by the one half of the duration of the SMTC window. In Example 5, there are a plurality of SMTC window shifted by the duration of the SMTC window in one SMTC period. The NR cell may be detected by the UE regardless of the position of the SSB.

Cell detection time regarding a worst case (the SSB of the NR cell is located after (M−N) ms from a start of the SMTC period) is 2*SMTC periodicity (M) ms. A reason why cell detection time of Example 5 is twice bigger than that of Example 4 is that a case, which time period of SSBs overlaps with two executive SMTC windows, is considered in Example 5.

In above mentioned Example 1 to Example 5, it is assumed that other conditions are enough to detect the NR cell with one SMTC period when the duration of the SMTC window is aligned with SSB transmitted from the NR cell.

To achieve shorter inter-RAT SFTD measurement time, Example 4 or 5 may be preferable.

Regarding values of the duration of the SMTC window such as 1 ms, 2 ms, 3 ms, 4 ms, 5 ms . . . , and a resolution for the SMTC offset is 1 ms, there is a need to set a rule for using a half duration of the SMTC window when odd values, for example, 1 ms, 3 ms and 5 ms, of the duration of the SMTC window are used. An example for the rule is specified as the following:
- if odd duration of SMTC window is 1 ms: one half SMTC window duration is not applied
- if odd duration of SMTC window duration is higher than 1 ms (e.g. 3 ms, 5 ms): one half SMTC window duration is replaced with round(one half SMTC window duration) or floor(one half SMTC window duration) or ceiling(one half SMTC window duration).

Once the UE detects the NR cell and measures the frame timing difference, the UE reports SFTD based on the frame timing difference to the E-UTRA cell. And, the E-UTRA cell changes SMTC configuration (e.g. SMTC offset) based on the reported SFTD. Thus all other UEs communicating with the E-UTRA cell can detect the NR cell with the changed SMTC configuration.

FIG. 11 illustrates examples of measuring a frame timing difference by a UE using a measurement gap.

The UE in FIG. 11 includes a shared RF receiver chain for a communication with a NR cell (SeNB) and a communication with a E-UTRA cell (MeNB). Thus the UE needs the MG for inter-RAT SFTD measurement. The E-UTRA cell transmits information related to the MG to the UE. The UE may measure a frame timing difference between the E-UTRA cell and the NR cell based on information related to the MG.

The information related to the MG includes a MG offset, a MG length (MGL) and a MG periodicity. For example, the MG offset is configured, by the E-UTRA cell, differently depending on a UE. That is, the E-UTRA cell provides different values of the MG offset to a plurality of UEs, such as UE 1, UE 2 and UE 3 of FIG. 11.

After each UE receives the information related to the MG, each UE performs measurements related to SSB of the NR cell based on the information related to the MG and a DL reference timing of the E-UTRA cell.

In FIG. 11, the SMTC window is configured based on the DL timing reference of the E-UTRA cell with the SMTC offset and {SMTC window duration (which is equal to a duration of a SMTC window), SMTC periodicity (which is equal to a length of a SMTC period)}. {SMTC window duration, SMTC periodicity} may be expressed as {N, M} ms.

The MG is configured with {MGL, MG periodicity}. {MGL, MG periodicity} may be expressed as {L, P}. The MG includes the SMTC window, and each UE performs measurements related to SSB of the NR cell within the SMTC window.

The NR cell is found by the UE based on a condition related to the SSB. The condition related to the SSB is an additional condition that SSB of the NR cell at least occasionally falls within the MG. For example, the MG offset is configured, by the E-UTRA cell, differently depending on UEs. If a UE detects the NR cell based on a detection of SSB of the NR cell, the UE measures a frame timing difference and SFTD based on the frame timing difference. Then the UE reports the SFTD to the E-UTRA cell, and the E-UTRA cell changes SMTC configuration and MG configuration based on the reported SFTD. Thus all other UEs communicating with the E-UTRA cell can detect the NR cell with the changed SMTC configuration and MG configuration.

2 examples are provided with FIG. 11 as below.

Example 1

The E-UTRA cell configures MG offsets with difference of 0, N, 2*N . . . . P-N to different UEs respectively. Each UE performs measurements related to SSB of the NR cell based on a SMTC window having starting point, with reference to a DL timing reference of the E-UTRA cell, of {SMTC offset+0, SMTC offset+N, SMTC offset+2*N, . . . . SMTC offset+P-N}. Where the SMTC window is located within each MG of the each UEs.

For example, a MG of UE 1 starts at MG offset after the DL timing reference of the E-UTRA cell and a SMTC window of UE 1 starts at SMTC offset after the DL timing reference of the E-UTRA cell. A MG of UE 3 starts at MG offset+2*N after the DL timing reference of the E-UTRA cell and a SMTC window of UE 1 starts at SMTC offset+2*N after the DL timing reference of the E-UTRA cell.

The number of UEs which are configured with different MG offset are needed at least {SMTC_periodicity (M)/SMTC_window_duration (N)} for both SMTC periodicity>MG periodicity and SMTC periodicity<=MG periodicity. Because a UE is assumed to detect and measure the NR cell based on maximum periodicity between SMTC periodicity and MG periodicity.

The NR cell may be detected at a UE which is configured with a MG that includes SSB of the NR cell. For example, UE 2 of Example 1 in FIG. 11.

If a UE is configured with a MG which includes SSB, cell detection time is as the following:

if SMTC periodicity>MG periodicity: the cell detection time is SMTC periodicity (M) ms.
  if SMTC periodicity=MG periodicity and the MG is shared with E-UTRA inter-frequency measurement and/or a measurement for other inter-RAT than NR: the cell detection time is 2*SMTC periodicity (M) ms.
  if SMTC periodicity=MG periodicity and the MG is not shared with E-UTRA inter-frequency measurement and/or a measurement for other inter-RAN than NR: the cell detection time is SMTC periodicity (M) ms.
  if SMTC periodicity<MG periodicity and the MG is shared with E-UTRA inter-frequency measurement and/or a measurement for other inter-RAT than NR: the cell detection time is 2*MG periodicity (P) ms.
  if SMTC periodicity<MG periodicity and the MG is not shared with E-UTRA inter-frequency measurement and/or a measurement for other inter-RAT than NR: the cell detection time is MG periodicity (P) ms.

Example 2

The E-UTRA cell configures MG offsets with difference of 0, N/2, N, . . . P-(3N/2), (P-N) to different UEs respectively. Each UE performs measurements related to SSB of the NR cell based on a SMTC window having starting point, with reference to a DL timing reference of the E-UTRA cell, of {SMTC offset+0, SMTC offset+N/2, SMTC offset+2*N/2, . . . . SMTC offset+P-(3N/2), SMTC offset+P-N}. Where the SMTC window is located within each MG of the each UEs.

For example, a MG of UE 1 starts at MG offset after the DL timing reference of the E-UTRA cell and a SMTC window of UE 1 starts at SMTC offset after the DL timing reference of the E-UTRA cell. A MG of UE 3 starts at MG offset+2*N/2 after the DL timing reference of the E-UTRA cell and a SMTC window of UE 1 starts at SMTC offset+2*N/2 after the DL timing reference of the E-UTRA cell.

The number of UEs which are configured with different MG offset are needed at least {2*SMTC_periodicity (M)/SMTC_window_duration (N)} for both SMTC periodicity>MG periodicity and SMTC periodicity<=MG periodicity. Because a UE is assumed to detect and measure the NR cell based on maximum periodicity between SMTC periodicity and MG periodicity.

The NR cell may be detected at a UE which is configured with a MG that includes SSB of the NR cell. For example, UE 3 of Example 1 in FIG. 11.

Cell detection time of Example 2 is same as the cell detection time of Example 1 if a UE is configured with a MG which includes SSB. The cell detection time of Example 2 is as the following:
- if SMTC periodicity>MG periodicity: the cell detection time is SMTC periodicity (M) ms.
- if SMTC periodicity=MG periodicity and the MG is shared with E-UTRA inter-frequency measurement and/or a measurement for other inter-RAT than NR: the cell detection time is 2*SMTC periodicity (M) ms.
- if SMTC periodicity=MG periodicity and the MG is not shared with E-UTRA inter-frequency measurement and/or a measurement for other inter-RAN than NR: the cell detection time is SMTC periodicity (M) ms.
- if SMTC periodicity<MG periodicity and the MG is shared with E-UTRA inter-frequency measurement and/or a measurement for other inter-RAT than NR: the cell detection time is 2*MG periodicity (P) ms.
- if SMTC periodicity<MG periodicity and the MG is not shared with E-UTRA inter-frequency measurement and/or a measurement for other inter-RAT than NR: the cell detection time is MG periodicity (P) ms.

Probability of cell detection of example 2 is expected to be higher than a probability of cell detection of example 1.

In above mentioned Example 1 to Example 2, it is assumed that other conditions are enough to detect the NR cell with one SMTC period when the duration of the SMTC window is aligned with SSB transmitted from the NR cell.

Regarding values of the duration of the SMTC window such as 1 ms, 2 ms, 3 ms, 4 ms, 5 ms . . . , and a resolution for the SMTC offset or the MG offset is 1 ms, there is a need to set a rule for using a half duration of the SMTC window when odd values, for example, 1 ms, 3 ms and 5 ms, of the duration of the SMTC window are used. An example for the rule is specified as the following:
- if odd duration of SMTC window is 1 ms: One half duration of SMTC window is not applied. The E-UTRA cell configures MG offsets with difference of 0, N, 2N, . . . , (P−N) to different UEs respectively. Each UE performs measurements related to SSB of the NR cell based on a SMTC window having starting point, with reference to a DL timing reference of the E-UTRA cell, of {SMTC offset+0, SMTC offset+N, SMTC offset+2N, . . . . SMTC offset+P−2N, SMTC offset+(P−N)}.
- if odd duration of SMTC window duration is higher than 1 ms (e.g. 3 ms, 5 ms): one half SMTC window duration is replaced with round(one half SMTC window duration) or floor(one half SMTC window duration) or ceiling(one half SMTC window duration). The E-UTRA cell configures MG offsets with difference of 0, round(N/2), N, . . . , round((P−N)/2), (P−N) to different UEs respectively. Each UE performs measurements related to SSB of the NR cell based on a SMTC window having starting point, with reference to a DL timing reference of the E-UTRA cell, of {SMTC offset+0, SMTC offset+round(N/2), SMTC offset+N, . . . . SMTC offset+round(P−(3N/2), SMTC offset+(P−N)}.

In above mentioned Example 1 to Example 5 of FIG. 10 and Example 1 to Example 5 of FIG. 11, cell detection time does not consider Rx beamforming. Thus, if Rx beamforming is configured, for example in FR 2, a number of RX beamforming should be multiplied to the above mentioned cell detection time.

In short, for Inter-RAT SFTD measurement without measurement gap, related cell detection time is one SMTC periodicity provided that UE is expected to measure it at every time interval of SMTC window duration (in Example 4 of FIG. 10), or two SMTC periodicity provided that UE is at every time interval of one half SMTC window duration (in Example 5 of FIG. 10).

For Inter-RAT SFTD measurement without measurement gap, related cell detection time in examples of FIG. 11 is applicable to a UE which is configured with MG that having MGL aligned with SSB of the NR cell.

For Inter-RAT SFTD measurement with measurement gap, SMTC periodicity, MG periodicity and MG sharing with E-UTRA inter-frequency measurement and/or other inter-RAT than NR are considered to define cell detection time related to inter-RAT SFTD measurement as mentioned above at explanations related to FIG. 11.

It is assumed that other conditions are enough in FIG. 10 and FIG. 11 to detect the NR cell with one SMTC period when the duration of the SMTC window is aligned with SSB transmitted from the NR cell.

If Rx beamforming is considered, for example in FR 2, a number of RX beamforming should be multiplied to the above mentioned cell detection time in examples of FIG. 10 and FIG. 11.

Figure 12:
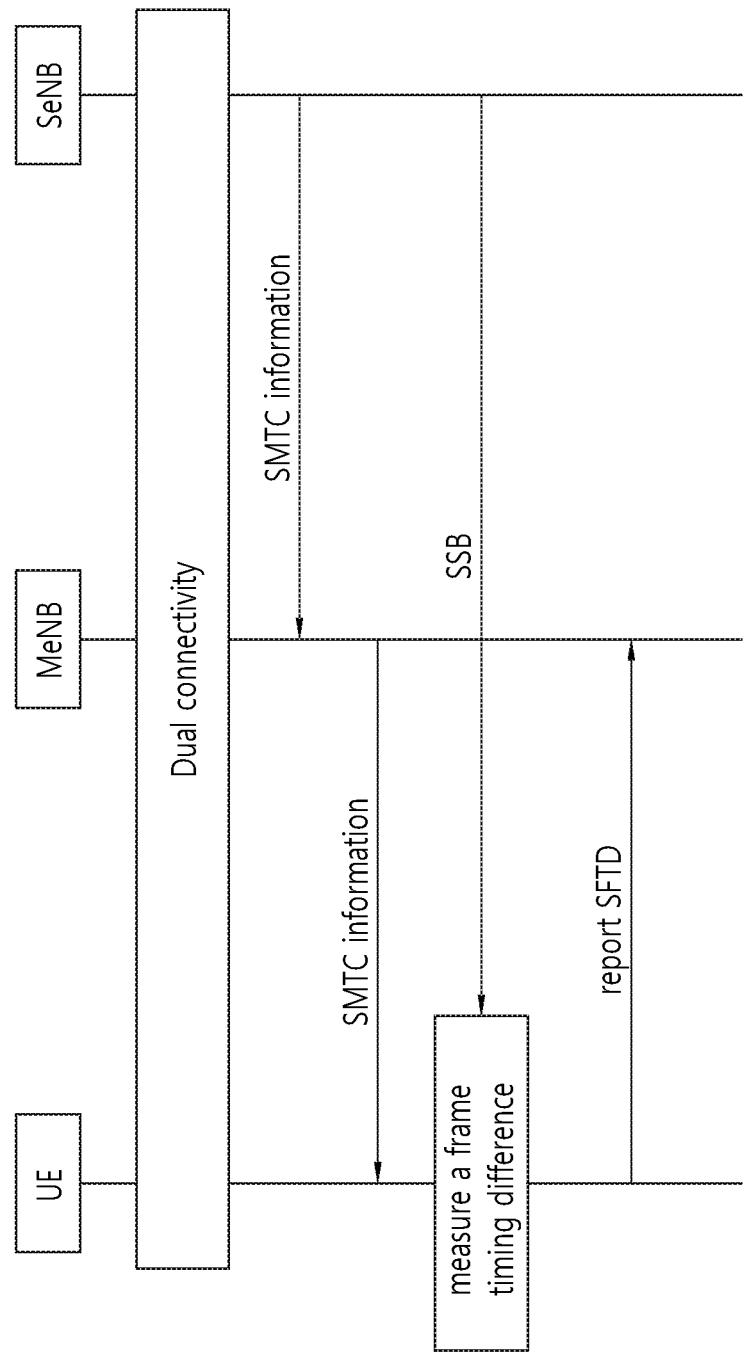
FIG. 12 is an example illustrating operations of a UE, a MeNB, and a SeNB based on a disclosure of this specification.

FIG. 12 is an example illustrating operations of a UE, a MeNB, and a SeNB based on a disclosure of this specification.

Dual connectivity (asynchronous EN-DC) with the UE, the MeNB (E-UTRA cell) and the SeNB (NR cell) is configured. The E-UTRA cell is configured as a primary cell and a secondary cell for the UE is not configured. The NR cell is a cell that is expected to be the secondary cell when the UE detects the NR cell based on SSB of the NR cell.

The NR cell transmits SMTC information to the E-UTRA cell. The SMTC information includes a length of a SMTC period, a duration of a SMTC window and a SMTC offset.

The E-UTRA cell transmits the received SMTC information to the UE. The E-UTRA cell does not know a DL timing reference of the NR cell. The E-UTRA cell may request SFTD measurement to the UE. For example, the E-UTRA cell may transmitted an IE related to the SFTD, such as reportSFTD-Meas. The E-UTRA may set reportSFTD-Meas to neighborCells. The E-UTRA cell may transmit information related to MG when the UE needs MG for measurements. At most one measurement identity using a reporting configuration with reportSFTD-Meas is configured by E-UTRAN The NR cell transmits SSB and the UE may measure frame timing difference between the E-UTRA cell and the NR cell based on the SMTC information. The UE may measure the frame timing difference based on the SMTC information and the information related to MG when the UE includes a shared RF receiver chain for the NR cell. The UE may measure the frame timing difference based on examples of FIG. 10 and FIG. 11.

After the UE detects the NR cell and measures the frame timing difference, the UE reports SFTD based on the frame timing difference to the E-UTRA cell. And, the E-UTRA cell changes SMTC configuration (e.g. SMTC offset) based on the reported SFTD. Thus all other UEs communicating with the E-UTRA cell can detect the NR cell with the changed SMTC configuration.

If the MG is applied for the measurements, the E-UTRA cell may configure different MG offset to UEs as examples of FIG. 11. Also, based on examples of FIG. 11, if the UE (for example, UE 2 of FIG. 11) can detect the NR cell, the UE will measure and report SFTD to the E-UTRA. And, the E-UTRA cell changes SMTC configuration and MG configuration based on the reported SFTD. Thus all other UEs communicating with the E-UTRA cell can detect the NR cell with the changed SMTC configuration and MG configuration.

An overall delay for the SFTD measurement may include RRC procedure delay, SFTD measurement delay and SFTD measurement reporting delay. The SFTD measurement may be carried out with or without a support of a MG. The UE may detect, identify and measure SFTD of up to 3 of the strongest NR cells on the carrier frequency, which is included in the NR carrier frequency information, provided by the E-UTRA cell. The UE may additionally report RSRP for one or more NR cells based on a configuration for the SFTD measurement provided by the E-UTRA cell.

In case a NR cell is added as the secondary cell, the UE may terminate the inter-RAT SFTD measurement. In case the primary cell is changed due to handover, the UE may terminate the inter-RAT SFTD measurement.

Figure 13:
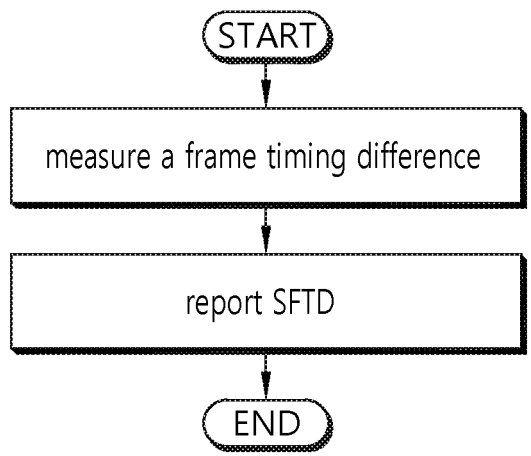
FIG. 13 is a flowchart illustrating operations of a UE based on a disclosure of this specification.

FIG. 13 is a flowchart illustrating operations of a UE based on a disclosure of this specification.

Based on (i) that an E-UTRA cell is configured for a primary cell and based on (ii) that a secondary cell is not configured, the UE measures a frame timing difference between the E-UTRA cell and a NR cell based on a SMTC period. The NR cell is found regardless of a position of a SSB of the NR cell.

The UE reports the SFTD based on the frame timing difference to the E-UTRA cell.

Based on that a measurement gap is not provided such as an explanation related to FIG. 10, the NR cell is found by the UE regardless of the position of the SSB of the NR cell in the SMTC period. The frame timing difference is measured based on shifting a time duration for measuring the SSB of the NR cell based on the length of the SMTC period and the duration of the SMTC window.

Based on that a measurement gap is provided such as an explanation related to FIG. 11, the NR cell is found based on a condition related to the SSB. For example, the condition is that the E-UTRA cell configures MG offset differently depending on a UE. The frame timing difference is measured based on a measurement gap offset, a measurement gap length (MGL) and a measurement gap periodicity.

Figure 14:
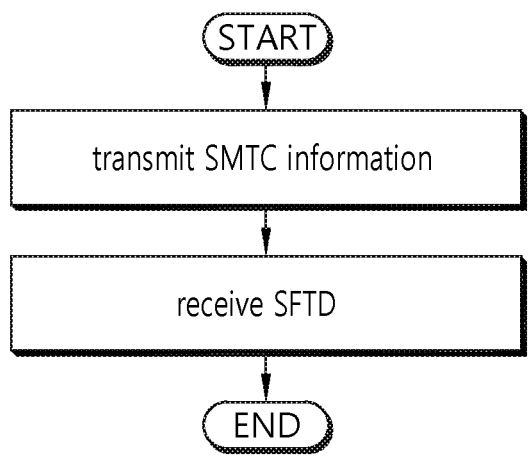
FIG. 14 is a flowchart illustrating operations of a base station based on a disclosure of this specification.

FIG. 14 is a flowchart illustrating operations of a base station based on a disclosure of this specification.

The base station of FIG. 14 is equal to the E-UTRA cell configured as the primary cell in the disclosure of this specification.

The base station transmits SMTC information which includes a length of the SMTC period, a duration of a SMTC window and a SMTC offset, to a UE. The base station may transmit information related to MG to the UE if the UE uses MG due to the UE includes a shared RF receiver chain for the NR cell. The information related to the MG includes a MG offset, a MG length (MGL) and a MG periodicity. The base station may configure the MG offset differently depending on a plurality of UE.

The base station receives SFTD, which is based on a frame timing difference between the BS and a New Radio (NR) cell, from the UE. Based on that the base station is configured for the primary cell for the UE and that a secondary cell for the UE is not configured, the frame timing difference is measured based on the SMTC period by the UE. The NR cell is found by the UE regardless of a position of a SSB of the NR cell. If the UE includes the shared RF receiver for the NR cell and the base station receives the SFTD from other UE, the base station changes SMTC configuration and MG configuration based on the reported SFTD.

Figure 15:
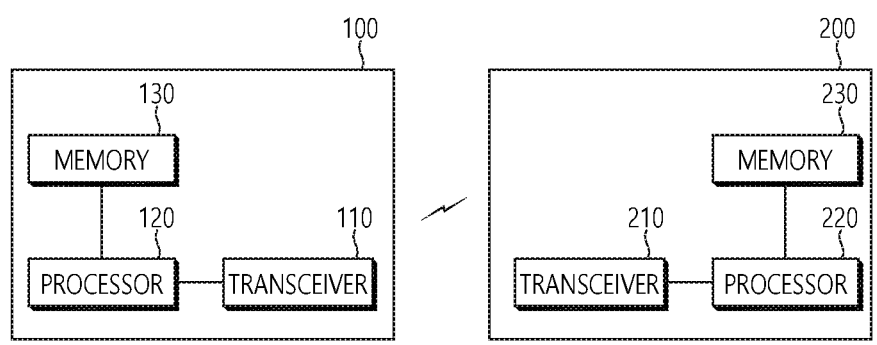
FIG. 15 is a block diagram illustrating a wireless device and a base station, by which a disclosure of this specification is implemented.

FIG. 15 is a block diagram illustrating a wireless device and a base station, by which the disclosure of this specification can be implemented.

Referring to FIG. 15, a wireless device 100 and a base station 200 may implement the disclosure of this specification. The wireless device 100 may be a UE of this specification. The base station 200 may be the E-UTRA cell or the NR cell of this specification.

The wireless device 100 includes a processor 120, a memory 130, and a transceiver 110. Likewise, the base station 200 includes a processor 220, a memory 230, and a transceiver 210. The processors 120 and 220, the memories 130 and 230, and the transceivers 110 and 210 may be implemented as separate chips, or at least two or more blocks/functions may be implemented through one chip.

Each of the transceivers 110 and 210 includes a transmitter and a receiver. When a particular operation is performed, either or both of the transmitter and the receiver may operate. Each of the transceivers 110 and 210 may include one or more antennas for transmitting and/or receiving a radio signal. In addition, each of the transceivers 110 and 210 may include an amplifier configured for amplifying a Rx signal and/or a Tx signal, and a band pass filter for transmitting a signal to a particular frequency band.

Each of the processors 120 and 220 may implement functions, procedures, and/or methods proposed in this specification. Each of the processors 120 and 220 may include an encoder and a decoder. For example, each of the processors 120 and 230 may perform operations described above. Each of the processors 120 and 220 may include an application-specific integrated circuit (ASIC), a different chipset, a logic circuit, a data processing device, and/or a converter which converts a base band signal and a radio signal into each other.

Each of the memories 130 and 230 may include a Read-Only Memory (ROM), a Random Access Memory (RAM), a flash memory, a memory card, a storage medium, and/or any other storage device.

Figure 16:
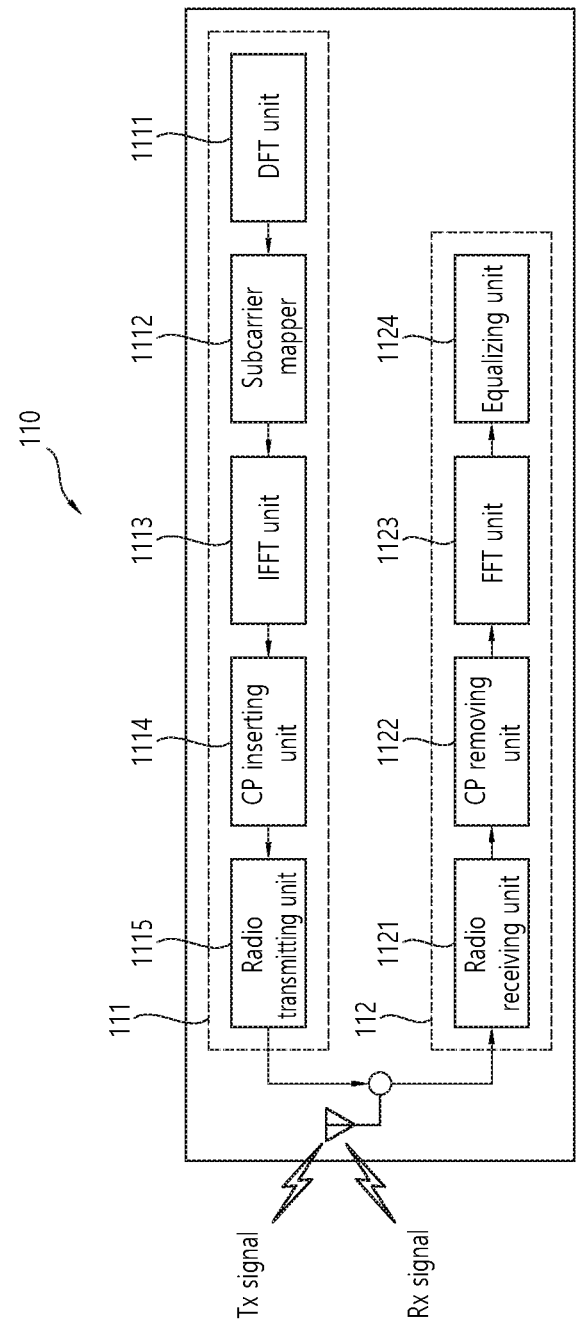
FIG. 16 is a detailed block diagram of a transceiver of the wireless device shown in FIG. 15.

FIG. 16 is a detailed block diagram illustrating a transceiver of the wireless device shown in FIG. 15.

Referring to FIG. 16, a transceiver 110 includes a transmitter 111 and a receiver 112. The transmitter 111 includes a Discrete Fourier Transform (DFT) unit 1111, a subcarrier mapper 1112, an IFFT unit 1113, a CP insertion unit 1114, a wireless transmitter 1115. In addition, the transceiver 1110 may further include a scramble unit (not shown), a modulation mapper (not shown), a layer mapper (not shown), and a layer permutator, and the transceiver 110 may be disposed in front of the DFT unit 1111. That is, in order to prevent a peak-to-average power ratio (PAPR) from increasing, the transmitter 111 may transmit information to pass through the DFT unit 1111 before mapping a signal to a subcarrier. A signal spread (or pre-coded for the same meaning) by the DFT unit 111 is subcarrier-mapped by the subcarrier mapper 1112, and then generated as a time domain signal by passing through the IFFT unit 1113.

The DFT unit 111 performs DFT on input symbols to output complex-valued symbols. For example, if Ntx symbols are input (here, Ntx is a natural number), a DFT size may be Ntx. The DFT unit 1111 may be called a transform precoder. The subcarrier mapper 1112 maps the complex-valued symbols to subcarriers of a frequency domain. The complex-valued symbols may be mapped to resource elements corresponding to a resource block allocated for data transmission. The subcarrier mapper 1112 may be called a resource element mapper. The IFFT unit 113 may perform IFFT on input symbols to output a baseband signal for data, which is a time-domain signal. The CP inserter 1114 copies a rear portion of the baseband signal for data and inserts the copied portion into a front part of the baseband signal. The CP insertion prevents Inter-Symbol Interference (ISI) and Inter-Carrier Interference (ICI), and therefore, orthogonality may be maintained even in multi-path channels.

Meanwhile, the receiver 112 includes a wireless receiver 1121, a CP remover 1122, an FFT unit 1123, and an equalizer 1124, and so on. The wireless receiver 1121, the CP remover 1122, and the FFT unit 1123 of the receiver 112 performs functions inverse to functions of the wireless transmitter 1115, the CP inserter 1114, and the IFFT unit 113 of the transmitter 111. The receiver 112 may further include a demodulator.

The processor may include an application-specific integrated circuit (ASIC), another chipset, a logical circuit and/or a data processing device. The memory may include a read-only memory (ROM), a random access memory (RAM), a flash memory, a memory card, a storage medium, and/or another storage device. The RF unit may include a baseband circuit for processing a wireless signal. When embodiments are implemented in software, the above described scheme may be implemented as a module for performing the above described function (process, function, etc.). The module is stored in the memory and may be executed by the processor. The memory may exit inside or outside the processor and may be connected to the processor in various known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of performing frame timing difference measurement in a wireless communication system, the method performed by a User Equipment (UE) and comprising:
    receiving measurement configuration information related to the frame timing difference measurement;
    in a state in which (i) an Evolved Universal Mobile Telecommunications System (UMTS) Terrestrial Radio Access (E-UTRA) cell is configured as a primary cell for the UE and (ii) a New Radio (NR) primary secondary cell (NR PSCell) is not configured for the UE:
        for frame timing difference measurement with a measurement gap: measuring a frame timing difference between the E-UTRA cell and an NR cell within a first measurement period, wherein the first measurement period is defined based on an integer multiple of maximum value between (i) a Synchronization Signal (SS)/Physical Broadcast Channel (PBCH) Block (SSB) Measurement Time Configuration (SMTC) period and (ii) a repetition period of the measurement gap determined from the measurement configuration information;
        for frame timing difference measurement without the measurement gap: measuring the frame timing difference between the E-UTRA cell and the NR cell within a second measurement period, wherein the second measurement period is defined based on an integer multiple of the SMTC period; and
    reporting, to the E-UTRA cell, a System Frame Number (SFN) and Frame Timing Difference (SFTD) based on measuring the frame timing difference.

2. The method of claim 1, wherein for the frame timing difference measurement without the measurement gap: the NR cell is found by the UE regardless of a position of an SSB of the NR cell in the SMTC period.

3. The method of claim 1, wherein for frame timing difference measurement with the measurement gap: the NR cell is found by the UE based on a condition related to an SSB.

4. The method of claim 1, further comprising:
    receiving SMTC information, which includes information relating to a length of the SMTC period, a duration of a SMTC window, and a SMTC offset.

5. The method of claim 1,
    wherein the frame timing difference is measured based on a difference between (i) a time of a start of a radio frame received from the E-UTRA cell and (i) a time of a start of a received radio frame from NR cell.

6. The method of claim 4,
    wherein based on that the UE includes a separated Radio Frequency (RF) receiver chain for the NR cell, the frame timing difference is measured based on shifting a time duration for measuring an SSB of the NR cell based on (i) the length of the SMTC period and (ii) the duration of the SMTC window.

7. The method of claim 1,
    wherein based on that the UE includes a shared Radio Frequency (RF) receiver chain for the NR cell and the E-UTRA cell, the frame timing difference is measured based on (i) a measurement gap offset, (ii) a measurement gap length (MGL), and (iii) the repetition period of the measurement gap.

8. The method of claim 7,
    wherein the measurement gap offset is configured differently for different UEs.

9. The method of claim 8, further comprising:
    receiving a frame timing difference value from the E-UTRA cell, based on that another UE has measured a frame timing difference based on another measurement gap offset which is configured differently from the measurement gap offset for the UE.

10. The method of claim 1, further comprising:
    receiving information for configuring the UE with E-UTRA-NR Dual Connectivity (EN-DC).

11. A user equipment (UE) for measuring a frame timing difference, the UE comprising,
    a transceiver;
    at least one processor; and
    at least one computer memory operatively coupled to the at least one processor and storing instructions that, based on being executed by the at least one processor, perform operations comprising:
    receiving measurement configuration information related to the frame timing difference measurement;
    in a state in which (i) an Evolved Universal Mobile Telecommunications System (UMTS) Terrestrial Radio Access (E-UTRA) cell is configured as a primary cell for the UE and (ii) a New Radio (NR) primary secondary cell (NR PSCell) is not configured for the UE:
        for frame timing difference measurement with a measurement gap: measuring a frame timing difference between the E-UTRA cell and an NR cell within a first measurement period, wherein the first measurement period is defined based on an integer multiple of maximum value between (i) a Synchronization Signal (SS)/Physical Broadcast Channel (PBCH) Block (SSB) Measurement Time Configuration (SMTC) period and (ii) a repetition period of the measurement gap determined from the measurement configuration information;

for frame timing difference measurement without the measurement gap: measuring the frame timing difference between the E-UTRA cell and the NR cell within a second measurement period, wherein the second measurement period is defined based on an integer multiple of the SMTC period; and reporting, to the E-UTRA cell, a System Frame Number (SFN) and Frame Timing Difference (SFTD) based on measuring the frame timing difference.

12. The UE of claim 11, wherein for the frame timing difference measurement without the measurement gap: the NR cell is found by the UE regardless of a position of an SSB of the NR cell in the SMTC period.

13. The UE of claim 11, wherein for frame timing difference measurement with the measurement gap: the NR cell is found by the UE based on a condition related to an SSB.

14. The UE of claim 11, wherein the operations further comprise:

receiving, through the transceiver, SMTC information, which includes information relating to a length of the SMTC period, a duration of a SMTC window, and a SMTC offset, wherein based on that the UE includes a separated Radio Frequency (RF) receiver chain for the NR cell, the frame timing difference is measured based on shifting a time duration for measuring an SSB of the NR cell based on (i) the length of the SMTC period and (ii) the duration of the SMTC window.

15. The UE of claim 11, wherein based on that the UE includes a shared Radio Frequency (RF) receiver chain for the NR cell and the E-UTRA cell, the frame timing difference is measured based on (i) a measurement gap offset, (ii) a measurement gap length (MGL), and (iii) the repetition period of the measurement gap, and wherein the measurement gap offset is configured differently for different UEs.

16. A method performed by a base station (BS) operating in a wireless communication system, the method comprising:

transmitting, to a user equipment (UE), Synchronization Signal (SS)/Physical Broadcast Channel (PBCH) Block (SSB) Measurement Time Configuration (SMTC) information, which includes information relating to a length of an SMTC period, a duration of a SMTC window, and a SMTC offset; and receiving, from the UE, a System Frame Number (SFN) and Frame Timing Difference (SFTD), which is based on a frame timing difference between the BS and a New Radio (NR) cell, wherein, in a state in which (i) the BS is configured as a primary cell for the UE, and (ii) a secondary cell for the UE is not configured:

for frame timing difference measurement with a measurement gap: the frame timing difference between BS and the NR cell is measured by the UE within a first measurement period, wherein the first measurement period is defined based on an integer multiple of maximum value between (i) the SMTC period and (ii) a repetition period of the measurement gap determined from measurement configuration information, for frame timing difference measurement without the measurement gap: the frame timing difference between the BS and the NR cell is measured by the UE within a second measurement period, wherein the second measurement period is defined based on an integer multiple of the SMTC period, and wherein the NR cell is found by the UE regardless of a position of a SSB of the NR cell within the SMTC period.

* * * * *